(12) United States Patent
Utsch et al.

(10) Patent No.: US 12,440,591 B2
(45) Date of Patent: Oct. 14, 2025

(54) HANDLE FOR ORAL-CARE IMPLEMENT FOR SAFE AND HYGIENIC USE BY MULTIPLE USERS AND METHOD OF DISINFECTING THE SAME

(71) Applicant: Braun GmbH, Kronberg (DE)

(72) Inventors: Joern Utsch, Eschborn (DE); Ulrich Stoerkel, Bad Nauheim (DE); Bianka Becker-Salzsaeuler, Liederbach (DE); Boris Atlas, Wiesbaden (DE); Michael Anthony Kaminski, Cincinnati, OH (US); Todd Lynn Watterson, Liberty Township, OH (US); Darcie Ann Ohlman, Monroe, OH (US); Andrea Schuering, Eschborn (DE); Alexander Hilscher, Oberursel (DE); Kervin Heinrich Kuechler, Darmstadt (DE); Andreas Maennchen, Frankfurt (DE); Erwin Paul Mark, Eschborn (DE)

(73) Assignee: Braun GmbH, Kronberg (DE)

( * ) Notice: Subject to any disclaimer, the term of this patent is extended or adjusted under 35 U.S.C. 154(b) by 865 days.

(21) Appl. No.: 17/690,461

(22) Filed: Mar. 9, 2022

(65) Prior Publication Data
US 2023/0285616 A1 Sep. 14, 2023

(51) Int. Cl.
*A61L 2/18* (2006.01)
*A61C 17/22* (2006.01)
(Continued)

(52) U.S. Cl.
CPC ............ *A61L 2/186* (2013.01); *A61C 17/225* (2013.01); *A61C 17/3481* (2013.01);
(Continued)

(58) Field of Classification Search
CPC ....... A61L 2/186; A61L 2/025; A61C 17/225; A61C 17/3481; B08B 3/12
See application file for complete search history.

(56) References Cited

U.S. PATENT DOCUMENTS

| | | | |
|---|---|---|---|
| 7,979,938 B2 | 7/2011 | Lilley et al. | |
| 8,621,701 B2 | 1/2014 | Meharry | |
| 8,943,635 B2 | 2/2015 | Heil et al. | |

FOREIGN PATENT DOCUMENTS

| | | | |
|---|---|---|---|
| CN | 110916836 A | 3/2020 | |
| CN | 210812721 U | 6/2020 | |
| KR | 20160022319 A | * 2/2016 | ............. A46B 13/02 |

OTHER PUBLICATIONS

English translation of KR-20160022319-A (Year: 2016).*
(Continued)

*Primary Examiner* — Sean E Conley
(74) *Attorney, Agent, or Firm* — Jay A. Krebs

(57) ABSTRACT

A handle for an oral-care implement, the handle comprises an electrical motor arranged to drive an output element structured and configured to couple the handle and a head attachable to and detachable from the handle; and a microcontroller for controlling the motor and to cause the output element to vibrate in (a) at least one oral-hygiene mode during which the oral-care implement is being used for an oral-hygiene routine, wherein the output element is vibrating at a substantially constant frequency, and (b) a disinfection mode during which the handle is being disinfected, before or after being used for the oral-hygiene routine, wherein the output element is continuously vibrating at a modulated frequency alternating within a frequency range of between about 140 Hz and about 250 Hz, for a duration of the disinfection mode.

13 Claims, 16 Drawing Sheets

(51) Int. Cl.
*A61C 17/34* (2006.01)
*A61L 2/025* (2006.01)
*A61L 101/16* (2006.01)
*A61L 101/34* (2006.01)
*A61L 101/36* (2006.01)
*B08B 3/12* (2006.01)

(52) U.S. Cl.
CPC ............... *A61L 2/025* (2013.01); *B08B 3/12* (2013.01); *A61L 2101/16* (2020.08); *A61L 2101/34* (2020.08); *A61L 2101/36* (2020.08); *A61L 2202/17* (2013.01); *A61L 2202/24* (2013.01)

(56) References Cited

OTHER PUBLICATIONS

All Office Actions; U.S. Appl. No. 17/690,469, filed Mar. 9, 2022.
Unpublished U.S. Appl. No. 17/690,469, filed Mar. 9, 2022 to Joern Utsch et al.

* cited by examiner

| Phase 1: Cleaning | | | | Phase 2: Disinfection | | | | Phase 3: Washing | | | |
|---|---|---|---|---|---|---|---|---|---|---|---|
| C0 | C1 | C2 | C3 | D0 | D1 | D2 | D3 | W0 | W1 | W2 | W3 |
| < YES > CLEAN & DISINFECT NOW? < NO > | < YES > READY TO CLEAN NOW? < NO > | CLEANING IN PROCESS | < YES > CONFIRM CLEANED, RINSED & TAPPED < NO > | < YES > READY TO DISINFECT NOW? < NO > | 0:20 PLACE IN DISINFECTANT | DISINFECTING | < YES > CONFIRM DISINFECTED < NO > | < YES > SUBMERGE IN WATER NOW < NO > | < YES > CONFIRM WASHED & TAPPED < NO > | < YES > CONFIRM ISOPROPANOL RINSE < NO > | READY FOR NEXT USE |

FIG. 10

HANDLE FOR ORAL-CARE IMPLEMENT FOR SAFE AND HYGIENIC USE BY MULTIPLE USERS AND METHOD OF DISINFECTING THE SAME

FIELD OF THE INVENTION

This invention is directed to oral-care implements, such as, e.g., electric toothbrushes, structured and configured for safe and hygienic use by multiple users, and a method of cleaning and disinfecting such oral-care implements.

BACKGROUND OF THE INVENTION

The need to test oral-care implements, such as, e.g., electric toothbrushes, with multiple users, whether conducted in a laboratory in the course of developing a new product or in a dental office to offer patients suitable choices of available oral-hygiene products, can be satisfied by offering every user or patient either a new (not yet used) implement or a fully disinfected implement for conducting a hygienically safe single-use trial.

A modern electric toothbrush generally includes a handle and a replaceable brush head (or "refill") attachable to and detachable from the handle. The handle, which typically contains a rechargeable battery and a motor, is the most expensive part of the toothbrush, while a disposable refill, which needs to be periodically replaced, is relatively inexpensive. An electric brush can typically have a plurality of brushing modes, e.g., a daily-clean mode, a pro-clean mode, a sensitive mode, a gum-care mode, a tongue-cleaning mode, a 3D-white mode, etc., selectable by a user. These modes typically differ from one another by a certain preset frequency and/or amplitude of the brush head's vibrations while the brush is vibrating in the chosen mode, selected by a user.

It is also generally known that a moderate change of frequency and/or amplitude may occur within a given mode. For example, Genius® brush (developed by the present assignee) has the frequency periodically changed in the range of from about 61 Hz to about 95 Hz and from about 51 Hz to about to 83 Hz within at least one of the multiple modes. U.S. Pat. No. 7,979,938, directed to a system for resonantly driving a power toothbrush having a resonant frequency, discloses a drive system including a circuit for changing the drive frequency to produce a predetermined regularly varying drive frequency relative to a center frequency to produce a regularly varying amplitude of the brush-head portion within the range of 5-30%, providing an improved sensory experience without discomfort to the user.

During brushing, saliva, mucosa, and blood from the patient's mouth almost inevitably come into contact with the inner parts of the toothbrush handle, and particularly the handle's adaptor arranged to be connected to the refill—and hence disposed adjacent to the refill during on oral-hygiene routine, such as, e.g., brushing of the teeth. The adapter may include hard-to-reach surfaces and cavities that may trap air bubbles and that are not readily available for cleaning and disinfection by conventional methods. Thus, even if a refill is replaced after each patient, the handle still needs to be fully disinfected before it could be safely and hygienically used by the next patient.

U.S. Pat. No. 8,621,701 discloses heat-sterilization and chemical sterilization of a dental brush. CN110916836 discloses an electric toothbrush having at least one of a power-on mode, a tooth brushing mode, a power reminding mode, a charging mode, a sterilizing mode, a spin-drying mode and a power-off mode. Utility Model CN210812721 U discloses an intelligent portable electric toothbrush disinfector with charging, drying, and disinfecting functions.

SUMMARY

The present disclosure offers a handle for an oral-care implement, such as, e.g., an electric toothbrush, that can be safely and hygienically disinfected after (or before) the use by an individual user—and thus could be safely used by multiple users. In general, this is accomplished by constructing a handle having a dedicated disinfection mode, during which the handle, when submerged in a liquid disinfecting medium, agitates the same—which, in turn, removes any trapped air bubbles, together with the rest of the undesirable substances, from cavities and hard-to-reach surfaces of the handle—and particularly those existing in and around the adapter for connecting the handle to the refill. The present disclosure also offers a method of cleaning and disinfecting such handle for an oral-care implement, which method allows safe and hygienic way to experience the benefits of the brush in a dental office by multiple users while avoiding the risk of transmitting any microbial or contaminated residue from one user to another.

In one aspect, the disclosure is directed to a handle for an oral-care implement, the handle comprising: an electrical motor arranged to drive an output element structured and configured to couple the handle and a head attachable to and detachable from the handle; and a microcontroller for controlling the motor and to cause the output element to vibrate in (a) at least one oral-hygiene mode during which the oral-care implement is being used for an oral-hygiene routine, wherein the output element is vibrating at a substantially constant frequency, and (b) a disinfection mode during which the handle is being disinfected, before or after being used for the oral-hygiene routine, wherein the output element is continuously vibrating at a modulated frequency alternating within a frequency range of between about 140 Hz and about 250 Hz, for a duration of the disinfection mode. In one embodiment, the modulated frequency alternates continuously and repeatedly within the indicated range.

As used herein, the terms "vibrate," "vibrating," and further permutations thereof refer to any rapid/high-frequency reciprocal movement, including, without limitation, a linear movement and a rotating-oscillating movement.

The duration of the disinfection mode can be from about 20 seconds to about 60 seconds, or from about 30 second to about 50 second, or from about 35 seconds to about 45 seconds. The modulated frequency may increase from about (155+5/−10) Hz to about (235+10/−5) Hz within about (11±2) seconds; may decrease from about (235+10/−5) Hz to about (165+5/−10) Hz within about (11±2) seconds; may increase from about (165+5/−10) Hz to about (235+10/−5) Hz within about (11±2) seconds; and may decrease from about (235+10/−5) Hz to about (190+5/−10) Hz within about (5.5±2) seconds. The modulated frequency may change substantially linearly during the duration of the disinfection mode.

In one embodiment, the at least one oral-hygiene mode comprises at least a first oral-hygiene mode and a second oral-hygiene mode different from the first oral-hygiene mode in at least one characteristic selected from the group consisting of frequency, amplitude, and any combination thereof. In a further embodiment, the at least one oral-hygiene mode comprises at least a third oral-hygiene mode different from the first oral-hygiene mode and the second oral-hygiene mode in at least one characteristic selected from the group consisting of frequency, amplitude, and any combination thereof.

In another aspect, the disclosure is directed to a method of disinfecting a handle for an oral-care implement comprising an electrical motor arranged to drive an output element structured and configured to couple the handle and a head attachable to and detachable from the handle, the method comprising steps of: (a) submerging the handle in a disinfecting liquid and (b) causing the output element to vibrate at a modulated frequency continuously alternating within a frequency range of between about 140 Hz and about 250 Hz for a duration of a disinfection mode, while the handle, including the output element, is fully submerged in the disinfecting liquid.

In one embodiment, the disinfecting liquid is an aqueous solution comprising about 2% of hydrogen peroxide (active germicide), pH buffers, metal ion, water-hardness-chelating agents, and corrosion inhibitor. In a further embodiment, the disinfecting liquid comprises from about 2% to about 3% by weight of 2-Furancarboxylic Acid, from about 1% to about 3% by weight of Hydrogen Peroxide, about 0.405% by weight of Potassium Hydroxide, about 0.4% by weight of Phosphoric Acid, and about 0.3% by weight of 1-Hydroxyethane-1,1-Diphosphoric Acid.

In one embodiment, the method comprises a step of cleaning the handle with a non-ammoniated surface cleaner in an ultrasonic bath, which step precedes the step of submerging the handle in a disinfecting liquid. In a further embodiment, the method further comprises a step of rinsing the handle with Isopropanol, following the step of causing the output element to vibrate at a modulated frequency and after the handle is removed from the disinfecting liquid.

In one embodiment, the step of causing the output element to vibrate at a modulated frequency comprises: increasing the modulating frequency from about (155+5/−10) Hz to (235+10/−5) Hz within about (11±2) seconds; subsequently decreasing the modulating frequency from about (235+10/−5) Hz to (165+5/−10) Hz within about (11±2) seconds; subsequently increasing the modulated frequency from about (165+5/−10) Hz to about (235+10/−5) Hz within about (11±2) seconds; and subsequently decreasing the modulated frequency from about (235+10/−5) Hz to a about (190+5/−10) Hz within about (5.5±2) seconds. The modulated frequency may increase and decrease continuously and in a substantially linearly manner.

In another aspect, the disclosure is directed to an oral-care implement for safe and hygienic use by multiple users, the implement comprising a handle structured and configured to be attached to a replaceable head, wherein the handle comprises: an electrical motor arranged to drive an output element structured and configured to couple the handle and the replaceable head; and a microcontroller for controlling the motor to cause the output element to vibrate in (a) at least one oral-hygiene mode during which the oral-care implement is being used for an oral-hygiene routine, wherein the output element is vibrating at a substantially constant frequency, and (b) a disinfection mode during which the handle is being disinfected, before or after being used for the oral-hygiene routine, wherein the output element is continuously vibrating at a modulated frequency continuously alternating within a frequency range of between about 140 Hz and about 250 Hz, for a duration of the disinfection mode.

In still another aspect, the disclosure is directed to a handle for an oral-care implement for safe and hygienic use by multiple users, the handle comprising: an electrical motor arranged to drive an output element structured and configured to couple the handle and a head attachable to and detachable from the handle; a display for displaying instructions to control functional operation of the handle; a microcontroller for controlling the motor and the display; and at least one switch, in operative communication with the microcontroller, to allow a user to control the functional operation of the handle, wherein the functional operation of the handle includes (a) causing the output element to vibrate in at least one oral-hygiene mode having an oral-hygiene frequency during which the oral-care implement is being used for an oral-hygiene routine, and (b) causing the output element to vibrate in a disinfection mode during a disinfection routine, when the handle is being disinfected before or after being used for the oral-hygiene routine, wherein the disinfection mode has a modulated frequency different from the oral-hygiene frequency and wherein during the disinfection routine the modulated frequency is continuously alternating up and down between a low modulated frequency and a high modulated frequency, wherein the high modulated frequency is at least 50 percent, more specifically at least 60 percent, and even more specifically at least 70 percent, greater than the low modulated frequency. In one embodiment, the modulated frequency continuously alternates up and down in a frequency range of from about 140 Hz to about 250 Hz. The at least one oral-hygiene mode may differ from the disinfection mode also in a vibration amplitude.

In one embodiment, controlling the functional operation of the handle comprises operating the at least one switch to control steps of a cleaning-and-disinfection procedure, wherein the cleaning-and-disinfection procedure comprises the disinfection routine. In a further embodiment, controlling the functional operation of the handle comprises operating the at least one switch to confirm that at least one step of the cleaning-and-disinfection procedure has been accomplished.

In a further aspect, the disclosure is directed to a cleaning-and-disinfection procedure for cleaning and disinfecting a handle for an oral-care implement having a display and comprising an electrical motor arranged to drive an output element structured and configured to physically couple the handle and a head of the oral-care implement, the handle having a microcontroller for controlling the motor and the display, the procedure comprising steps of: (a) cleaning the handle with a non-ammoniated surface cleaner in an ultrasonic bath for at least about 90 seconds, and (b) disinfecting the handle in a disinfecting liquid, wherein the step of disinfecting comprises submerging the handle in the disinfecting liquid and causing the output element to vibrate at a modulated frequency continuously alternating within a frequency range of between about 140 Hz and about 250 Hz for at least about 20 seconds. The step of cleaning may last for at least about 120 seconds. The step of disinfecting may last for at least about 35 seconds.

In one embodiment, the cleaning-and-disinfection procedure comprises a step of rinsing the handle with water after the step of cleaning and prior to the step of disinfecting. In a further embodiment, the procedure comprises a step of rinsing the handle with Isopropanol for at least about 5 seconds, following the step of disinfecting.

In one embodiment, the procedure comprises operating at least one switch in operative communication with the microcontroller, to confirm that the handle is ready for proceeding to at least one of the step of cleaning and the step of disinfecting and/or to confirm that at least one of the step of cleaning and the step of disinfecting has been accomplished.

In still another aspect, the disclosure is directed to an oral-care system for safe and hygienic use by multiple users, the system comprising: a handle and a replaceable head attachable to and detachable from the handle, the handle having an electrical motor arranged to drive an output element structured and configured to couple the handle and the head; a microcontroller for controlling the motor; a user interface for obtaining information and communicating instructions related to controlling functional operation of the handle, wherein the user interface includes at least one switch in operative communication with the microcontroller to allow a user to control the functional operation of the handle; wherein the functional operation of the handle includes (a) causing the output element to vibrate in at least one oral-hygiene mode during which the oral-care implement is being used for an oral-hygiene routine, and (b) causing the output element to vibrate in a disinfection mode characterized by a modulated frequency continuously alternating up and down within a frequency range of from about 140 Hz to about 250 Hz during a disinfection routine taking place before or after the oral-hygiene routine.

The user interface can be selected from the group consisting of a display, a speaker, a microphone, and any combination thereof. More specifically, the user interface can be selected from the group consisting of a user interface incorporated into the handle, a user interface decoupled from the handle, and any combination thereof. The display can be selected from the group consisting of a screen of a smartphone, a screen of a wireless tablet, a screen of a computer, a screen dedicated to the oral-care system, and any combination thereof. The at least one switch can be selected from the group consisting of a switch controllable by a push button, a switch controllable by a rotatable selector, a switch controllable by an On/Off rocker, a switch controllable by a touch-screen surface, a switch controllable by a voice of a user, a switch controllable by a software protocol, and any combination thereof.

In yet a further embodiment, the disclosure is directed to a handle for an electric oral-care implement wherein a motor's output element is structured to vibrate in (a) at least one oral-hygiene mode during which the oral-care implement is being used for an oral-hygiene routine, wherein the output element is vibrating at a substantially constant frequency, and (b) a disinfection mode during which the handle is being disinfected, before or after being used for the oral-hygiene routine, wherein the output element is continuously vibrating at a modulated frequency continuously alternating within a frequency range between a low modulated frequency and a high modulated frequency, wherein the high modulated frequency is at least 50 percent, more specifically at least 60 percent, and even more specifically at least 70 percent, greater than the low modulated frequency.

BRIEF DESCRIPTION OF THE DRAWINGS

While the specification concludes with claims which particularly point out and distinctly claim the subject matter that is regarded as the invention, the various embodiments will be better understood from the following description taken in conjunction with the accompanying drawings, in which:

FIG. 10 is a an embodiment of a user-interface display structured and configured to exhibit interactive information and commands for a user to act upon;

DETAILED DESCRIPTION

Figure 1:
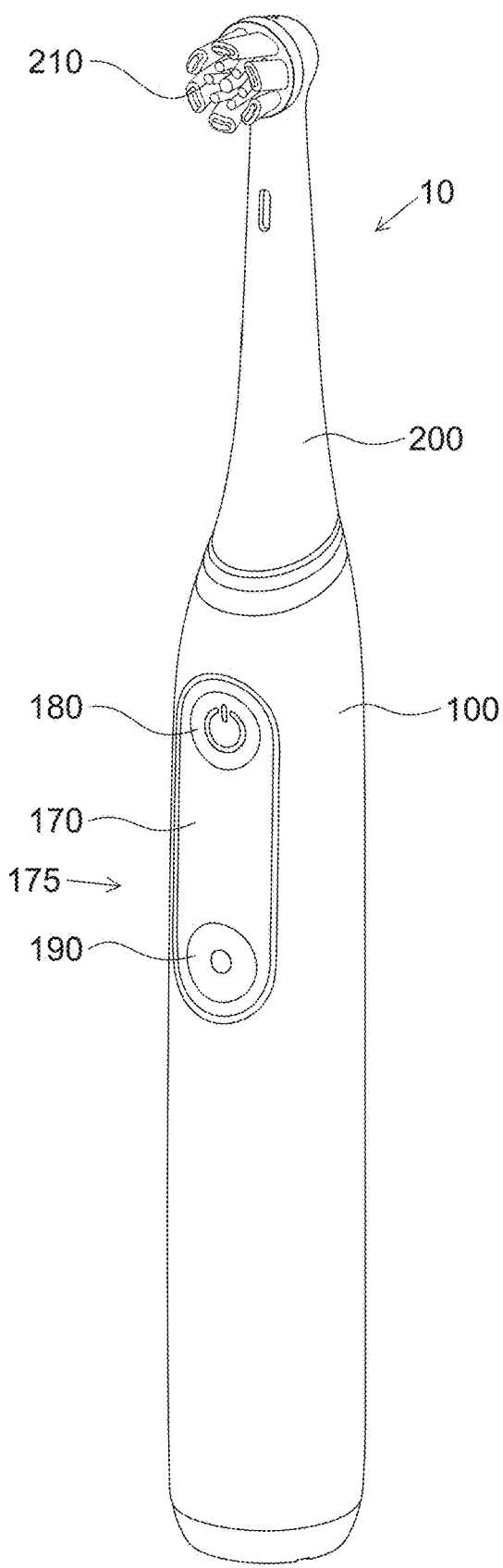
FIG. 1 is a schematic view of an example oral-care implement comprising an electric brush with a brush head attached to a handle.
Figure 2:
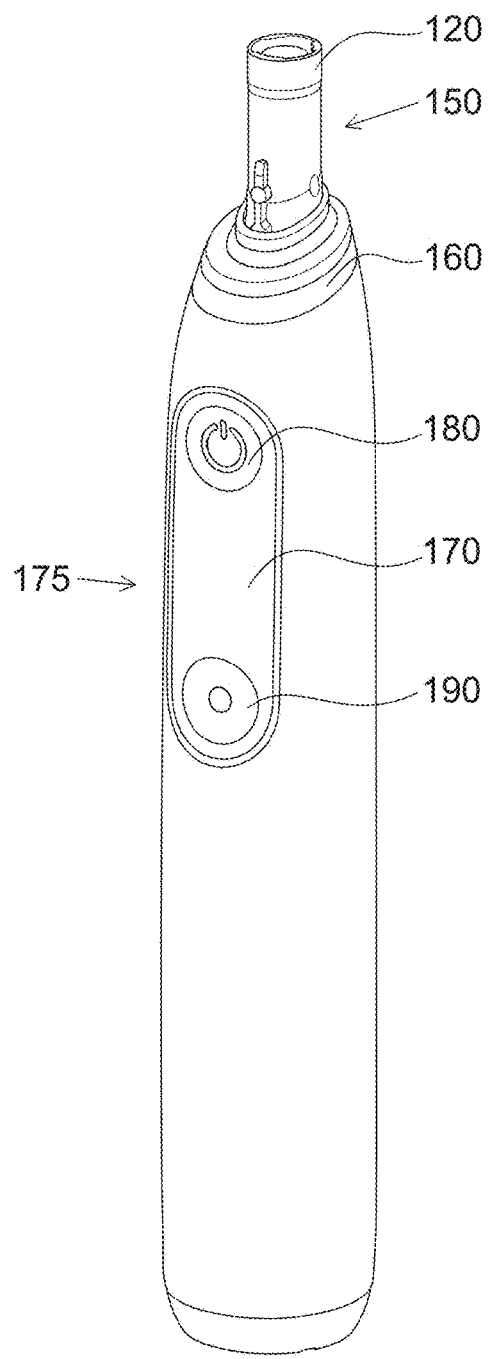
FIG. 2 is a schematic view of the handle of the toothbrush shown in FIG. 1, from which the brush head is removed.

An example oral-care implement, shown in FIGS. 1 and 2, is an electric toothbrush 10. Although the present disclosure is presented primarily in the context of a toothbrush, it is not limited to toothbrushes, as the invention described and claimed herein can be applicable to other electric oral-care implements, including professional ones.

As is shown on FIGS. 1 and 2, he brush 10 has a handle 100 and a replaceable head 200. The head 200 is attachable to and detachable from the handle 100 via a coupling connector 150, including an output element 120. The output element 120 is disposed at the handle's end and is configured to transmit a movement generated by an electrical motor 110 (FIG. 12) disposed in the handle 100 to cleaning elements 210 of the head 200 (FIG. 1). The coupling between the handle 100 and the replaceable head 200 can be mechanical (e.g., tight-fit or form-fit), magnetic, pneumatic, or any other coupling known in the art.

During brushing, saliva and blood from the mucus membranes of the mouth can come into contact with the inner parts of the coupling connector 150, including the output element 120. Therefore, if the same handle 100 is to be used for multiple patients, there is a need to ensure that the handle 100, including the adapter 150 and the output element 120, are properly disinfected and cleaned after every patient, and before the next patient could safely use it.

The handle 100 includes an electrical motor 110 (FIG. 12) arranged to drive the output element 120 structured and configured to couple the handle 100 and the head 200, as is known in the art. When the handle 100 is coupled to the head 200, the output element 120, which is in operative communication with the motor 110, transmits the movement from the motor 110 to a drive mechanism disposed in the head 200—and ultimately to the cleaning elements 210 (FIG. 1), as is known in the art. In the example embodiment of the brush 10 illustrated in FIG. 1, the head 200 is designed to have its cleaning elements 210 move in an oscillating-rotating manner. The present disclosure, however, is not limited to brushes designed to have oscillating-rotation movement of the cleaning elements, as all types of cleaning movements, such as, vibratory, linear, up-and-down ("pocking"), etc., are contemplated herein. The term "vibrate" and permutation thereof are used herein to describe all kinds of movements of the output element 120 and of the cleaning elements 210.

The handle 100 includes a microcontroller 130 (FIG. 12) for controlling the motor 110 and causing the output element 120 to vibrate in (a) at least one oral-hygiene mode during which the oral-care implement is being used for an oral-hygiene routine, wherein the output element 120 is vibrating at a substantially constant frequency, and (b) a disinfection mode during which the handle 100 is being disinfected, before or after being used for the oral-hygiene routine.

Thus, the oral-care implement 10, and more specifically its handle 100, has at least two functionally distinctive modes of operation: the oral-hygiene (or brushing) mode and a disinfection mode. A single oral-hygiene mode can be characterized by a pre-defined setting that includes either a pre-defined frequency or a pre-defined amplitude, or both, as is known in the art. Thus, a user can conveniently choose a certain mode, among a plurality of available oral-hygiene modes, each having specific pre-defined settings, thereby avoiding tuning the brush's settings (such as, e.g., frequency or amplitude) to a desired value. The oral-hygiene mode, used during routine brushing of teeth, can be characterized by the output element's vibration at a substantially constant frequency. In the embodiment of the brush 10 shown in several figures herein, a user can select a desired mode by pressing a mode switch (i.e., a button) 190 located on the handle 100. The mode switch 190 can be also used for controlling a cleaning- and disinfection procedure, as will be discussed in detail herein below.

Figure 3:
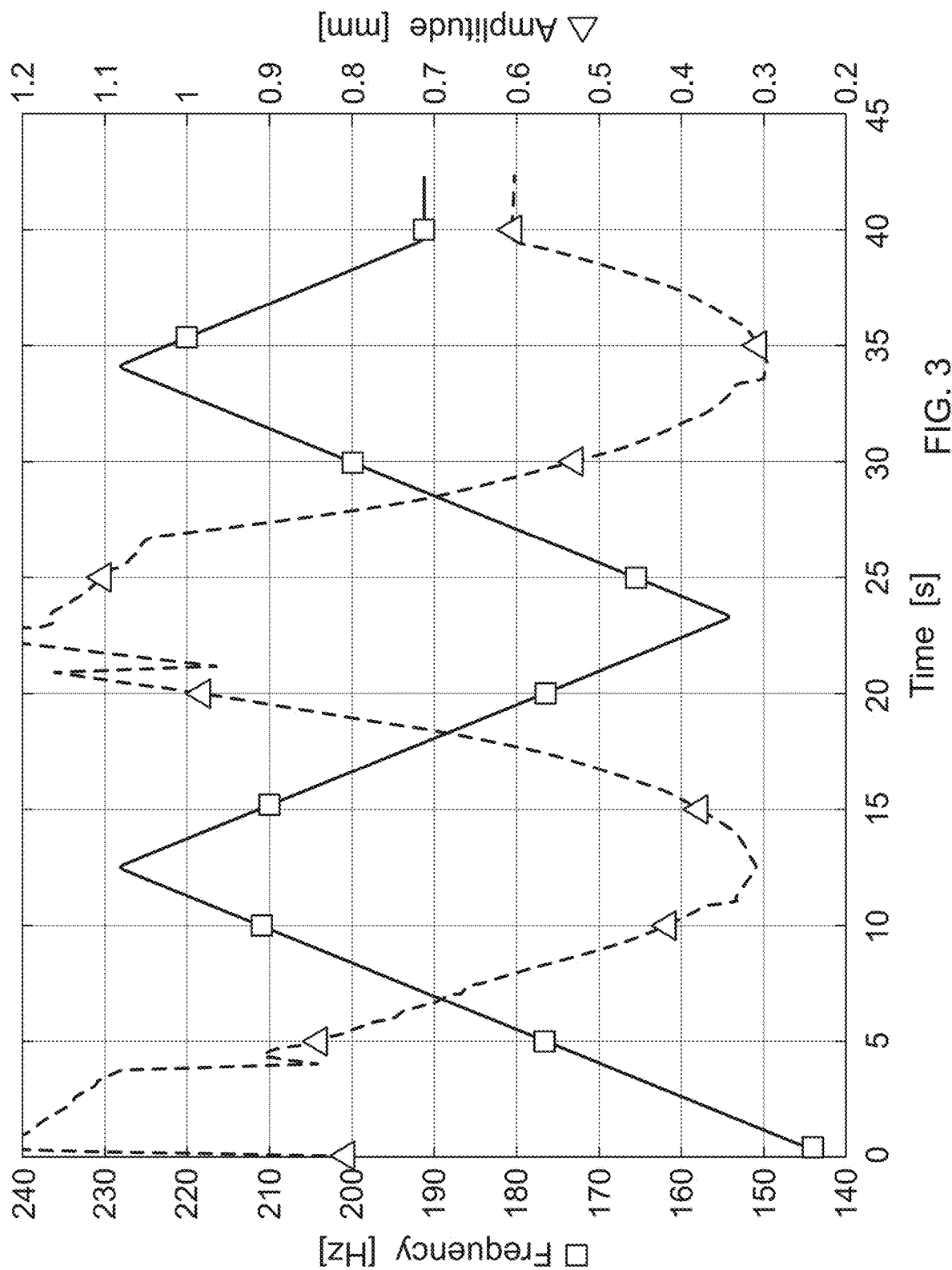
FIG. 3 is a graph representing a disinfection mode, during which the output element of the handle vibrates at a modulated frequency.

The disinfection mode, used for disinfecting at least the handle 100 of the oral-care implement 10, is characterized by the output element's vibration at a modulated (i.e., recurrently changing up and down) frequency that alternates within a broad range of frequency, in a range of between about 140 Hz and about 250 Hz, see FIG. 3, showing is a graph representing an example disinfection mode, during which the output element 120 of the handle 100 vibrates at a modulated frequency (solid line in FIG. 3) in the range of from about 155 Hz to about 230 Hz.

A duration of the disinfection mode can be from about 20 seconds to about 60 seconds, or from about 30 second to about 50 second, or from about 35 seconds to about 45 seconds. During the disinfection mode, the output element 120 vibrates in a "sweeping" manner, continuously alternating up and down multiple times within a certain frequency range, e.g., (155+5/−10) Hz to about (235+10/−5) Hz. The frequency can increase gradually, and decrease gradually, within a certain period of time. For example, the modulated frequency may increase gradually or decrease gradually within (5±2) seconds, (6±2) seconds, (7±2) seconds, (8±2) seconds, (9±2) seconds, (10±20) seconds, (11±20) seconds, (12±20) seconds, (13±2) seconds, (14±20) seconds, (15±2) seconds.

In one exemplary embodiment, during the disinfection mode, the modulated frequency may increase from about (155+5/−10) Hz to about (235+10/−5) Hz within about (11±2) seconds, decrease from about (235+10/−5) Hz to about (165+5/−10) Hz within about (11±2) seconds, increase from about (165+5/−10) Hz to about (235+10/−5) Hz within about (11±2) seconds, and decrease from about (235+10/−5) Hz to about (190+5/−10) Hz within about (5.5±2) seconds. As is shown in FIG. 3, the modulated frequency may change substantially linearly during the duration of the disinfection mode, although other implementations of the frequency "sweep" are also contemplated, wherein the modulated frequency may change non-linearly, e.g., intermittently, sinusoidally, unevenly, or otherwise irregularly.

As is known in the art, the handle 100 may be structured and configured to have multiple oral-hygiene modes, each characterized by its own frequency and/or amplitude. For example, the brush 10 may have at least a first oral-hygiene mode, a second oral-hygiene mode, a third oral-hygiene mode, and so on, wherein each oral-hygiene mode differs from the others in at least one characteristic selected from the group consisting of frequency, amplitude, and any combination thereof. Commonly assigned U.S. Pat. No. 8,683,635, the disclosure of which is incorporated herein by reference, describes an electric toothbrush that is selectively operable in at least a first brushing mode and a second brushing mode.

One embodiment of a method of disinfecting the handle 100 comprises the steps of: (a) submerging the handle 100 in a disinfecting liquid and (b) causing the output element 120 to vibrate at a modulated frequency continuously alternating within a frequency range of between about 140 Hz and about 250 Hz for a duration of a disinfection mode, while the handle 100, including the output element 120, is fully submerged in the disinfecting liquid. An example of the disinfecting liquid is an aqueous solution comprising about 2% of hydrogen peroxide (active germicide), pH buffers, metal ion, water-hardness-chelating agents, and corrosion inhibitor. The disinfecting liquid may further comprise from about 2% to about 3% by weight of 2-Furancarboxylic Acid, from about 1% to about 3% by weight of Hydrogen Peroxide, about 0.405% by weight of Potassium Hydroxide, about 0.4% by weight of Phosphoric Acid, and about 0.3% by weight of 1-Hydroxyethane-1,1-Diphosphoric Acid.

In one embodiment, the method comprises a step of cleaning the handle 100 with a non-ammoniated surface cleaner in an ultrasonic bath, which step precedes the step of submerging the handle 100 in a disinfecting liquid. In a further embodiment, the method further comprises a step of rinsing the handle 100 with Isopropanol, following the step of causing the output element 120 to vibrate at a modulated frequency and after the handle 100 is removed from the disinfecting liquid.

In one embodiment, the step of causing the output element 120 to vibrate at a modulated frequency comprises: increasing the modulating frequency from about (155+5/−10) Hz to (235+10/−5) Hz within about (11±2) seconds; subsequently decreasing the modulating frequency from about (235+10/−5) Hz to (165+5/−10) Hz within about (11±2) seconds; subsequently increasing the modulated frequency from about (165+5/−10) Hz to about (235+10/−5) Hz within about (11±2) seconds; and subsequently decreasing the modulated frequency from about (235+10/−5) Hz to a about (190+5/−10) Hz within about (5.5±2) seconds. The modulated frequency may increase and decrease continuously and in a substantially linearly manner.

In another aspect, the disclosure is directed to an oral-care implement 10 for safe and hygienic use by multiple users, the implement comprising a handle 100 structured and configured to be attached to a replaceable head 200, wherein the handle 100 comprises: an electrical motor 110 arranged to drive an output element 120 structured and configured to couple the handle 100 and the replaceable head 200; and a microcontroller 130 for controlling the motor 110 to cause the output element 120 to vibrate in (a) at least one oral-hygiene mode during which the oral-care implement 10 is being used for an oral-hygiene routine, wherein the output element 120 is vibrating at a substantially constant frequency, and (b) a disinfection mode during which the handle 100 is being disinfected, before or after being used for the oral-hygiene routine, wherein the output element 120 is continuously vibrating at a modulated frequency continuously alternating within a frequency range of between about 140 Hz and about 250 Hz, for a duration of the disinfection mode.

In still another aspect, the disclosure is directed to a handle 100 for an oral-care implement 10 for safe and hygienic use by multiple users, the handle 100 comprising: an electrical motor 110 arranged to drive an output element 120 structured and configured to couple the handle 100 and a head 200 attachable to and detachable from the handle 100; a user-interface display 170 for displaying instructions to control functional operation of the handle 100; a microcontroller 130 for controlling the motor 130 and the display 170; and at least one switch 180, in operative communication with the microcontroller 130, to allow a user to control the functional operation of the handle 100, wherein the functional operation of the handle 100 includes (a) causing the output element 120 to vibrate in at least one oral-hygiene mode having an oral-hygiene frequency during which the oral-care implement is being used for an oral-hygiene routine, and (b) causing the output element 120 to vibrate in a disinfection mode during a disinfection routine, when the handle 100 is being disinfected before or after being used for the oral-hygiene routine, wherein the disinfection mode has a modulated frequency different from the oral-hygiene frequency. The at least one oral-hygiene mode may differ from the disinfection mode in a vibration amplitude. The oral-hygiene frequency is substantially constant and the modulated frequency continuously alternates up and down in a frequency range of from about 140 Hz to about 250 Hz.

In one embodiment, controlling the functional operation of the handle 100 comprises operating the at least one switch 180 to control steps of a cleaning-and-disinfection procedure, wherein the cleaning-and-disinfection procedure comprises the disinfection routine. In a further embodiment, controlling the functional operation of the handle 100 comprises operating the at least one switch 180 to confirm that at least one step of the cleaning-and-disinfection procedure has been accomplished.

In a further aspect, the disclosure is directed to a cleaning-and-disinfection procedure for cleaning and disinfecting a handle 100 for an oral-care implement having a display 170 and comprising an electrical motor 110 arranged to drive an output element 120 structured and configured to physically couple the handle 100 and a head 200 of the oral-care implement 10, the handle 100 having a microcontroller 130 for controlling the motor 110 and the display 170, the procedure comprising steps of: (a) cleaning the handle 100 with a non-ammoniated surface cleaner in an ultrasonic bath for at least about 90 seconds, and (b) disinfecting the handle 100 in a disinfecting liquid, wherein the step of disinfecting comprises submerging the handle 100 in the disinfecting liquid and causing the output element 120 to vibrate at a modulated frequency continuously alternating within a frequency range of between about 140 Hz and about 250 Hz for at least about 20 seconds. The step of cleaning may last for at least about 120 seconds. The step of disinfecting may last for at least about 35 seconds.

Figure 10A:
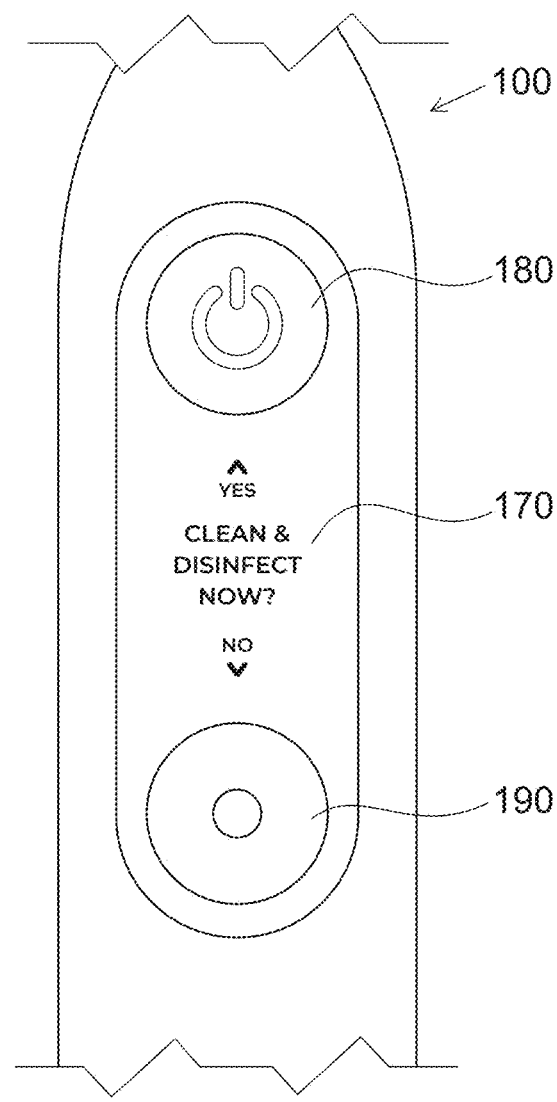
FIGS. 10A-10M show an embodiment of a user-interface display incorporated into a handle of an oral-care implement and exhibiting example information and commands for a user to act upon.
Figure 10D:
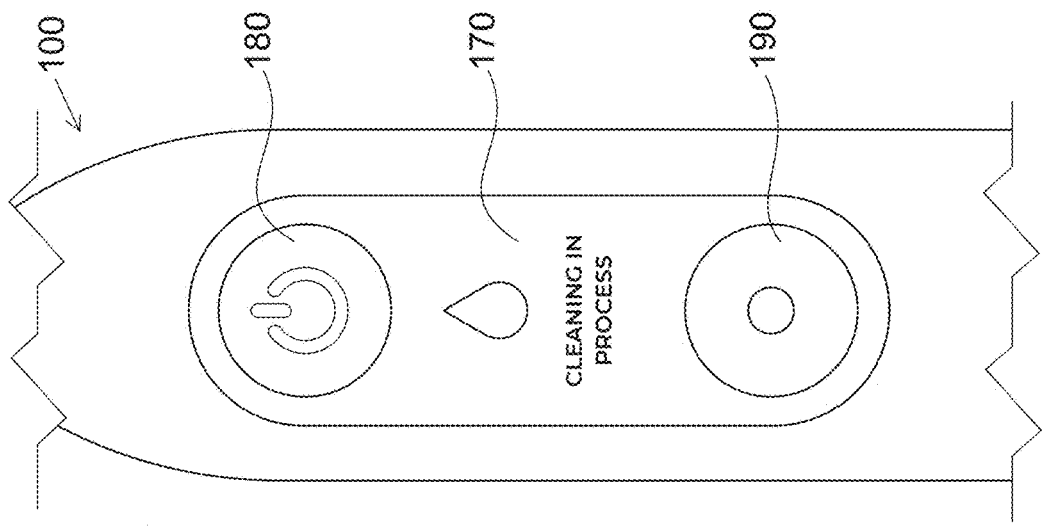

FIG. 10 illustrates an embodiment, or rather embodiments, of exemplary ikons, messages, instructions, and commands that a user-interface display 170 can be structured and configured to exhibit, to direct a user to act upon. FIGS. 10A-10M illustrate an embodiment of the user-interface display 170 incorporated into the handle 100 and exhibiting similar examples of information and commands for a user to act upon in the course of performing the cleaning- and disinfection procedure. While the default language could be English, the software and the display 170 could be arranged to allow an initial selection of the language, so that all messages could be displayed in the language selected by a user. FIG. 11 is a more detailed illustration of one embodiment of the cleaning- and disinfection procedure, which includes the steps of cleaning, disinfection, and washing.

In one embodiment, the cleaning-and-disinfection procedure comprises a step of rinsing the handle 100 with water after the step of cleaning and prior to the step of disinfecting. In a further embodiment, the procedure comprises a step of rinsing the handle 100 with Isopropanol for at least about 5 seconds, following the step of disinfecting.

In one embodiment, the procedure comprises operating at least one switch 180 in operative communication with the microcontroller 130, to confirm that the handle 100 is ready for proceeding to at least one of the step of cleaning and the step of disinfecting and/or to confirm that at least one of the step of cleaning and the step of disinfecting has been accomplished.

Figure 4:
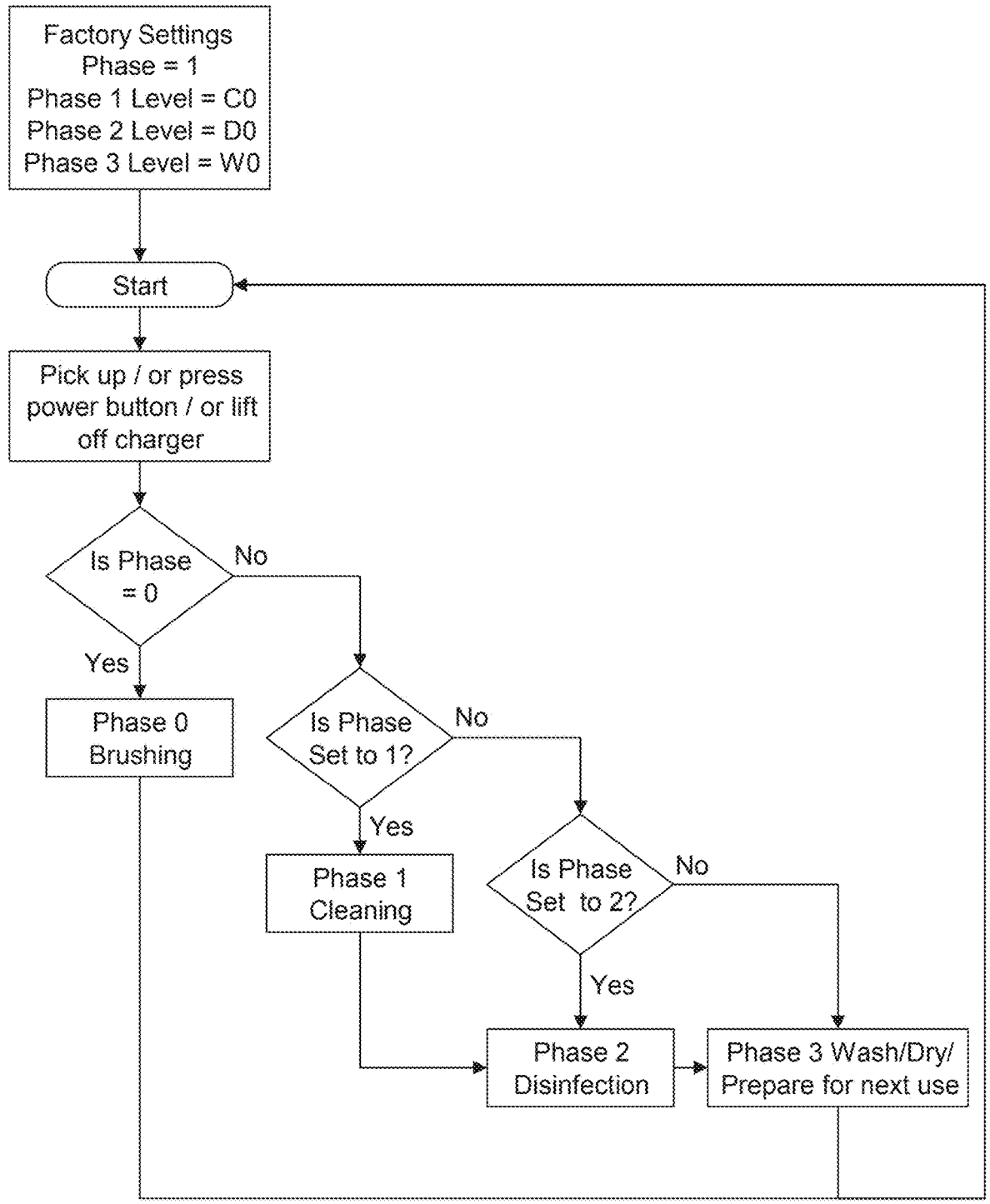
FIG. 4 is a schematic diagram representing an overall cleaning-and-disinfection procedure.
Figure 5:
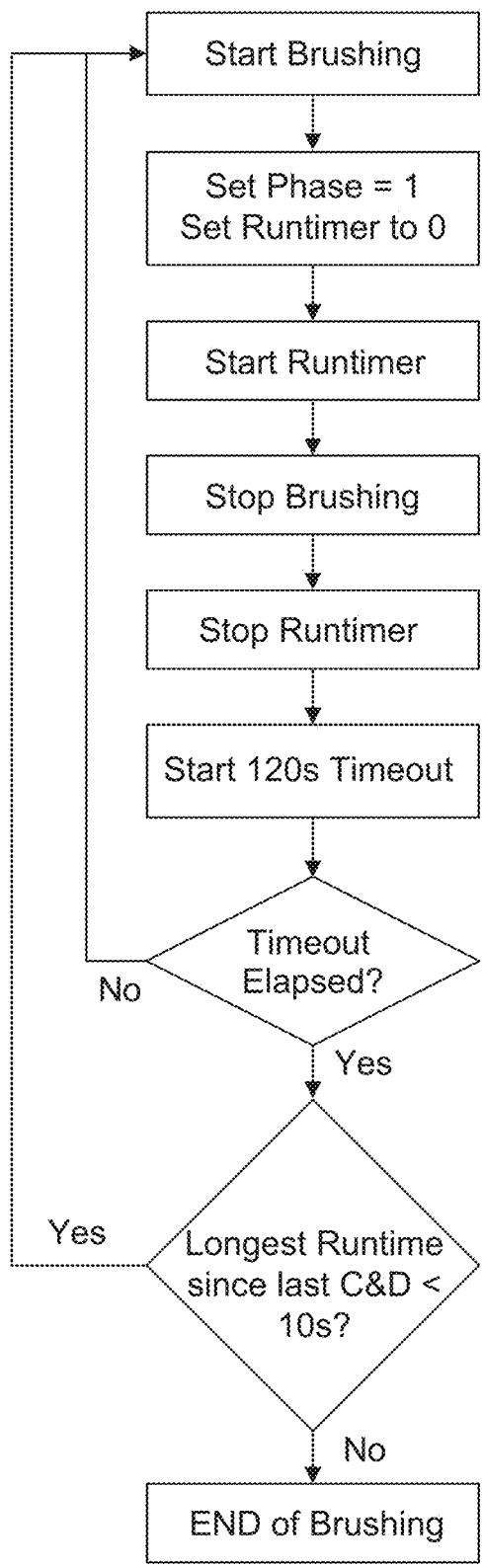
FIG. 5 is a schematic diagram representing an oral-hygiene/brushing routine.
Figure 6:
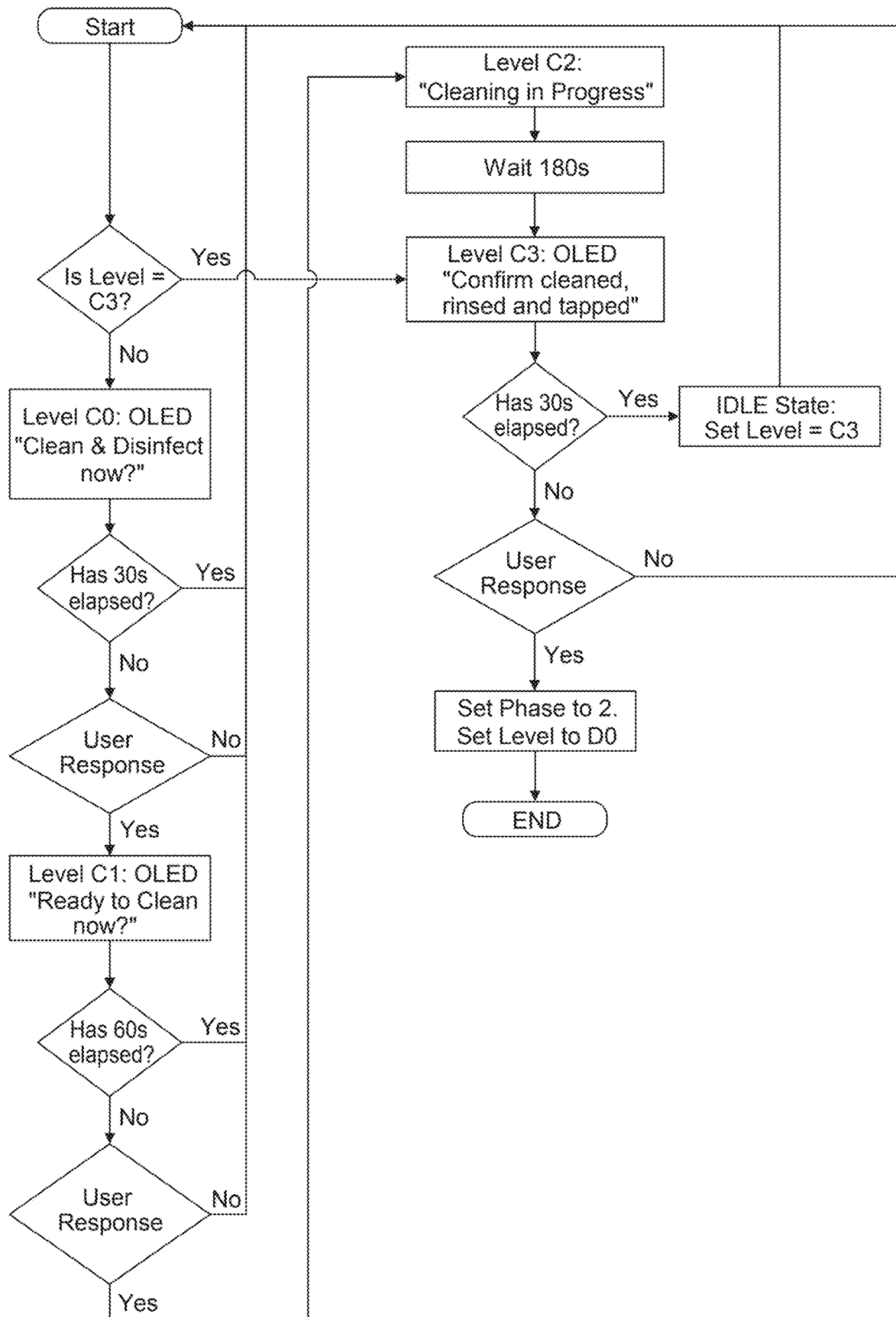
FIG. 6 is a schematic diagram representing a cleaning phase.
Figure 7:
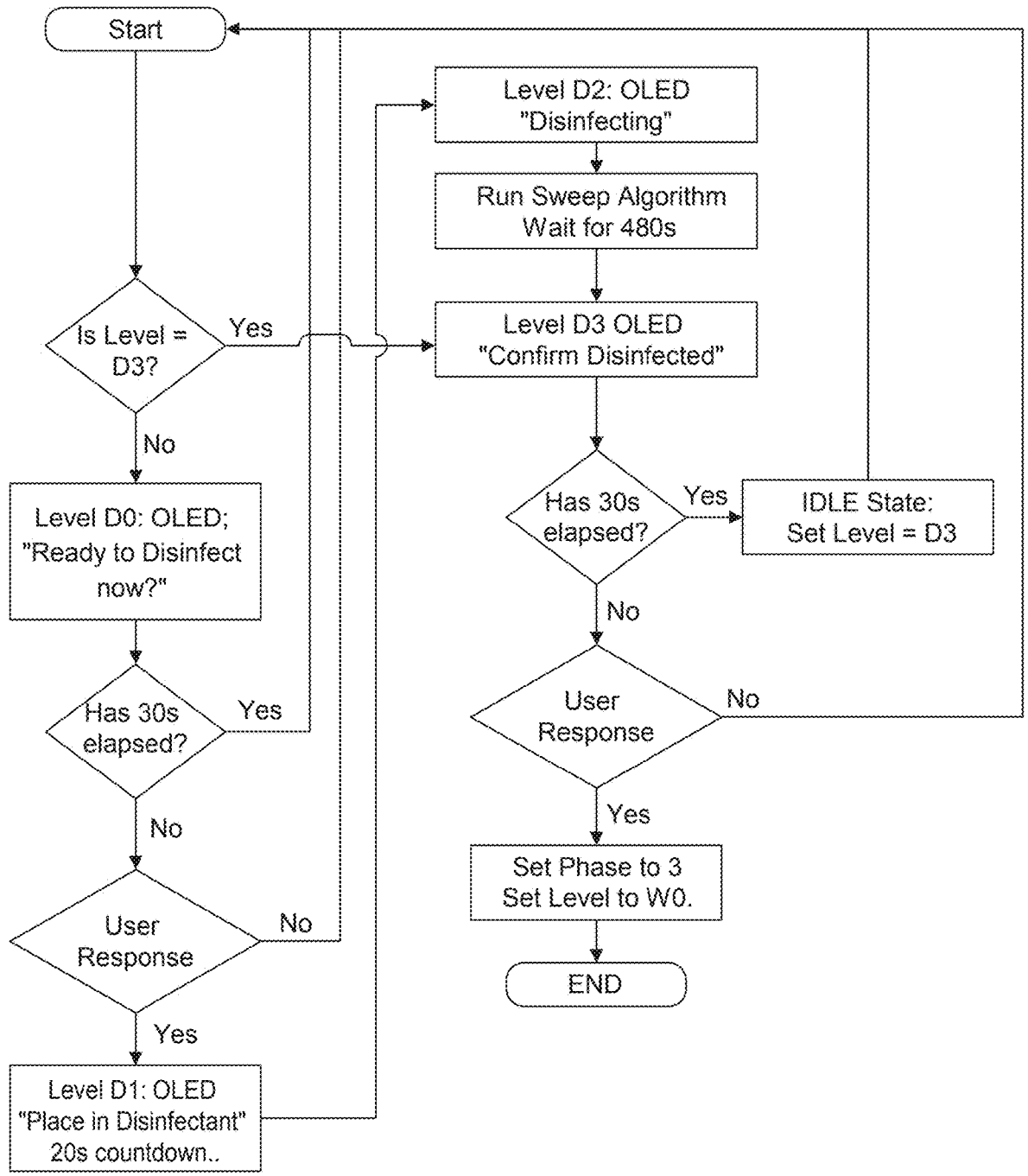
FIG. 7 is a schematic diagram representing a disinfection phase.
Figure 8:
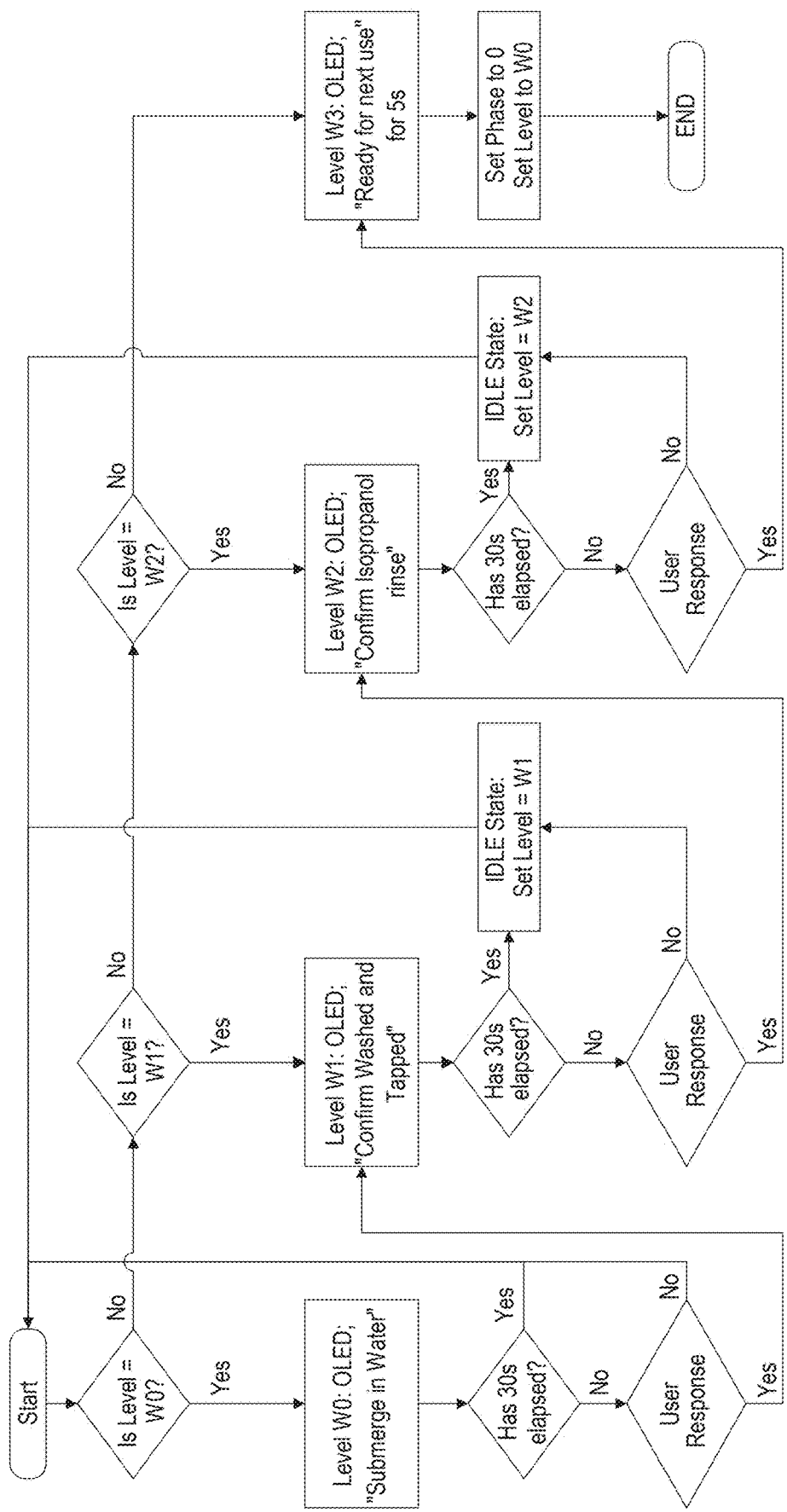
FIG. 8 is a schematic diagram representing a washing phase.
Figure 9:
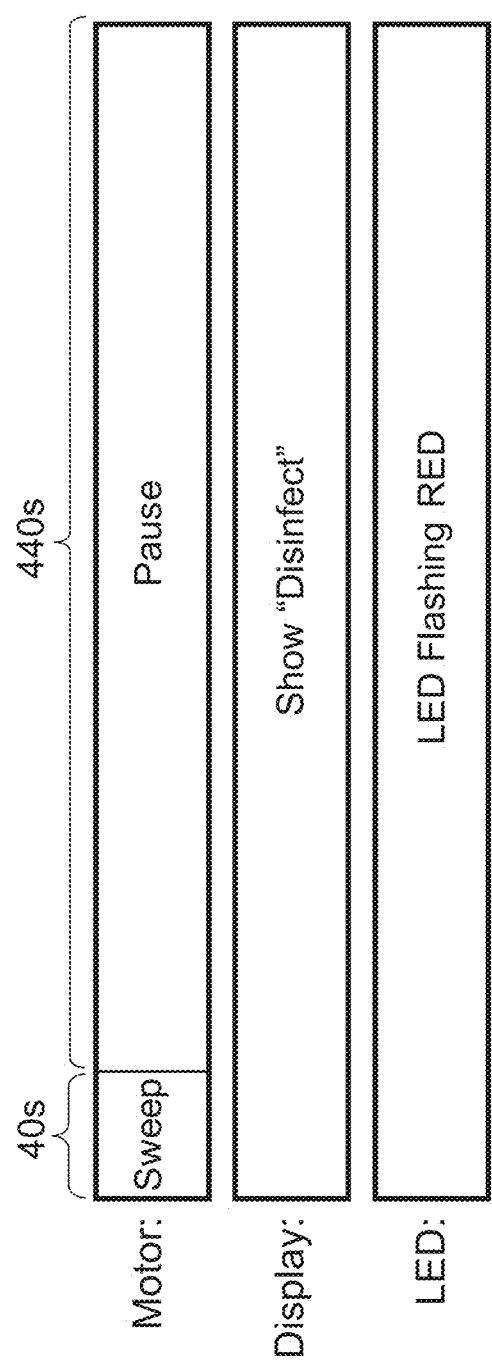
FIG. 9 is a block diagram schematically representing a disinfection cycle.

FIGS. 4-9 illustrate several phases and aspects of the cleaning- and disinfection procedure. FIG. 4 shows an example flowchart of an embodiment of the overall process, comprising several consecutive routines/phases of the overall process of testing the oral-care implement 10, including brushing, cleaning, disinfecting, and washing/drying/preparing for next use. FIG. 5 shows an example flowchart of an embodiment of the step of brushing. FIG. 6 shows an example flowchart of an embodiment of the step of cleaning. FIG. 7 shows an example flowchart of an embodiment of the step of disinfecting. FIG. 8 shows an example of flowchart of an embodiment of the step of washing/drying/preparing for next use. FIG. 9 schematically illustrates a disinfection cycle.

An example embodiment of the cleaning-and-disinfection procedure includes a procedure conducted in the following consecutive steps and sub-steps, during which an operator, e.g., dental professional, follows the instructions/prompts on the toothbrush handle's user-interface display 170. The instructions may require an input/feedback by the operator, e.g., pressing either a "power" button 180 or a "mode" button 190 (FIGS. 10A-10M and 11) in response to the prompts displayed on the display 170 of the handle 100 (if the display 170 is incorporated in the handle 100). To ensure appropriate cleaning and disinfection sequence of steps and times, only after the operator's input can the system proceed to the next step. In the absence of the operator's timely input the system will return to the previous step or start all over again. To ensure correct cleaning and disinfection times, the system may be designed to prevent the operator from providing input by a temporary lock-out. The following procedure is one example of the cleaning- and disinfection procedure according to the present disclosure, see FIGS. 10A-10M and 11.

Figure 10C:
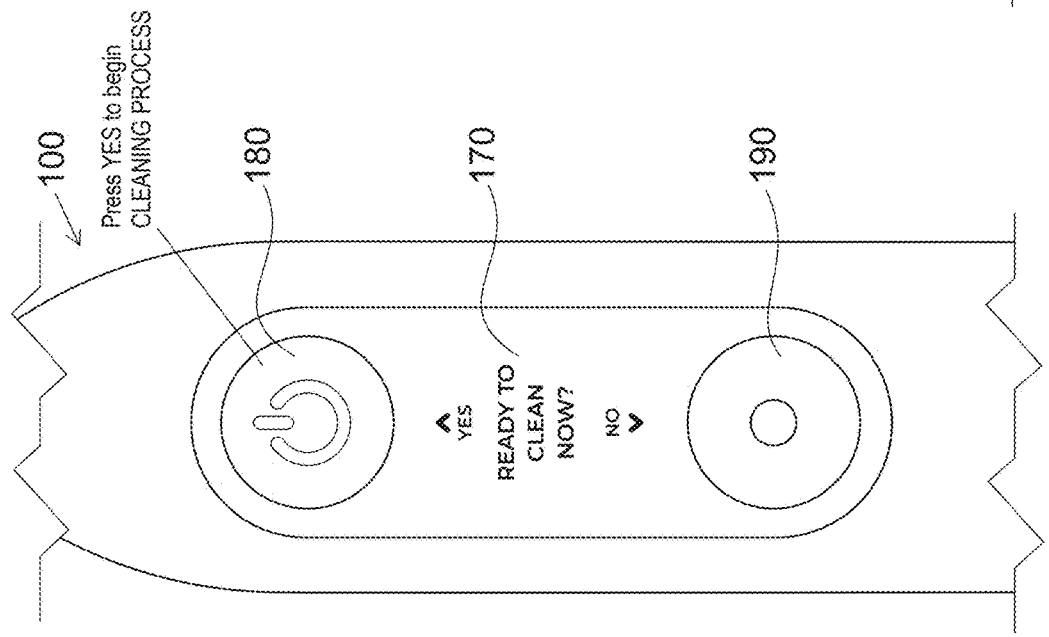
Figure 10B:
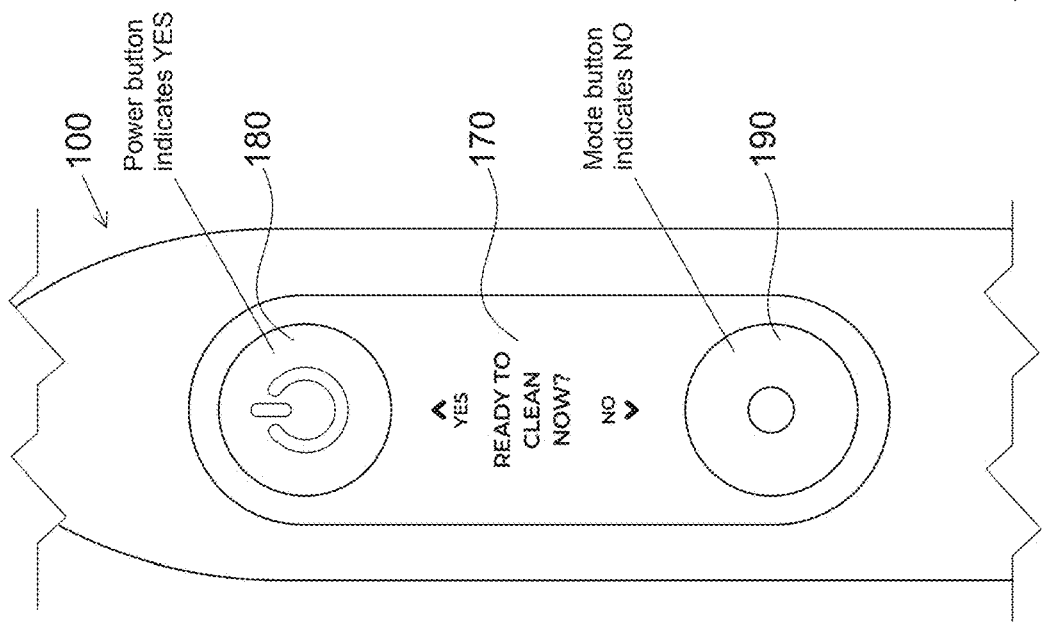
Figure 10G:
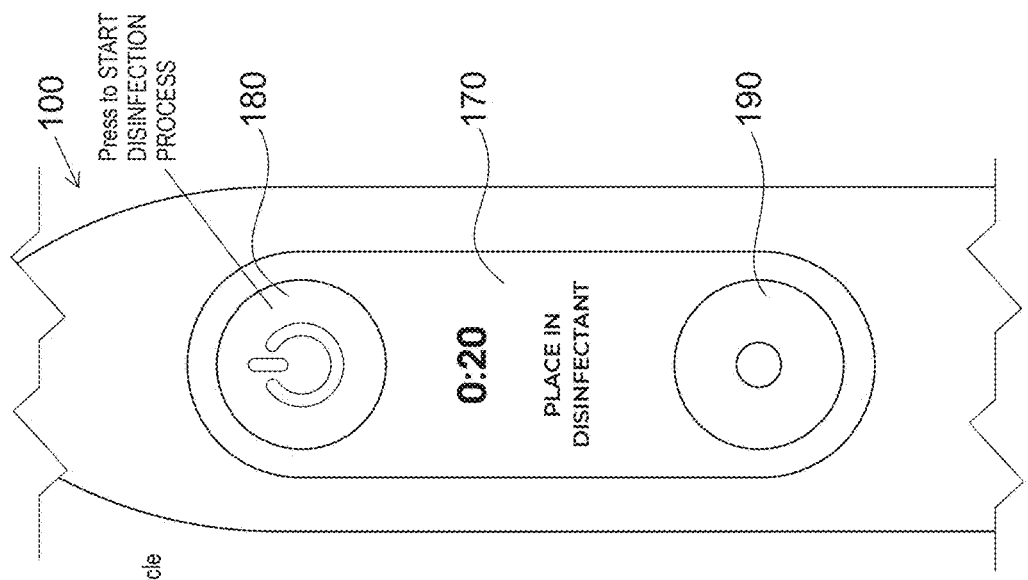
Figure 10F:
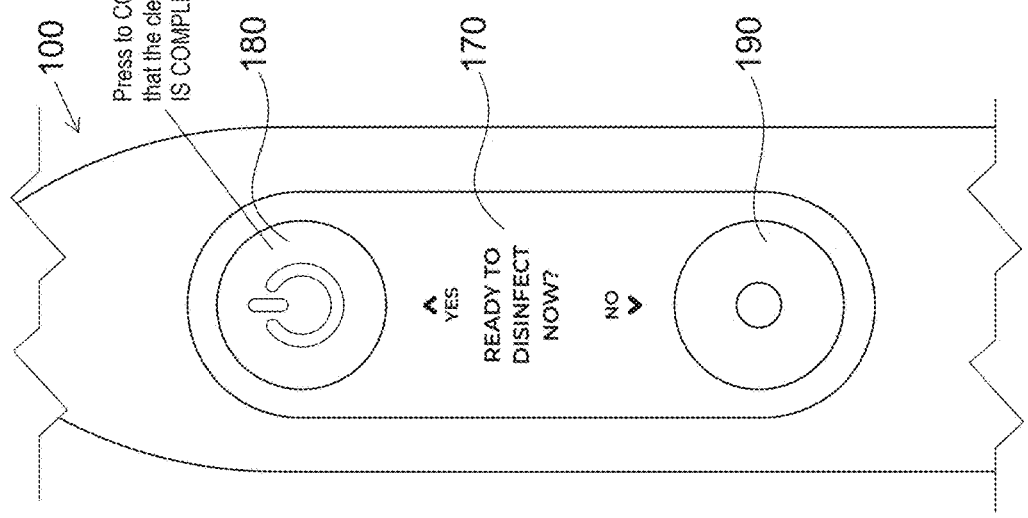
Figure 10E:
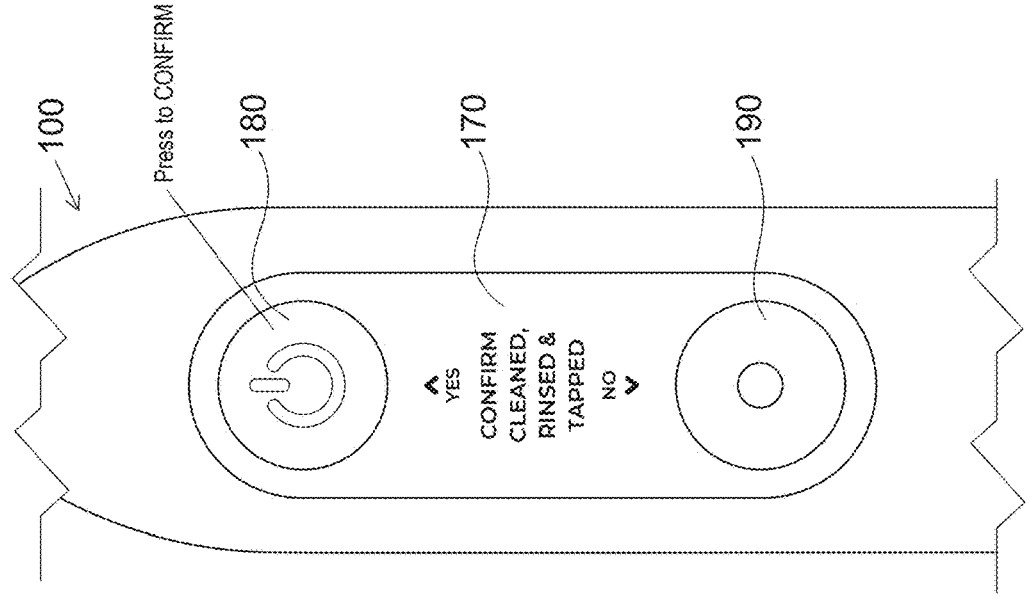
Figure 11:
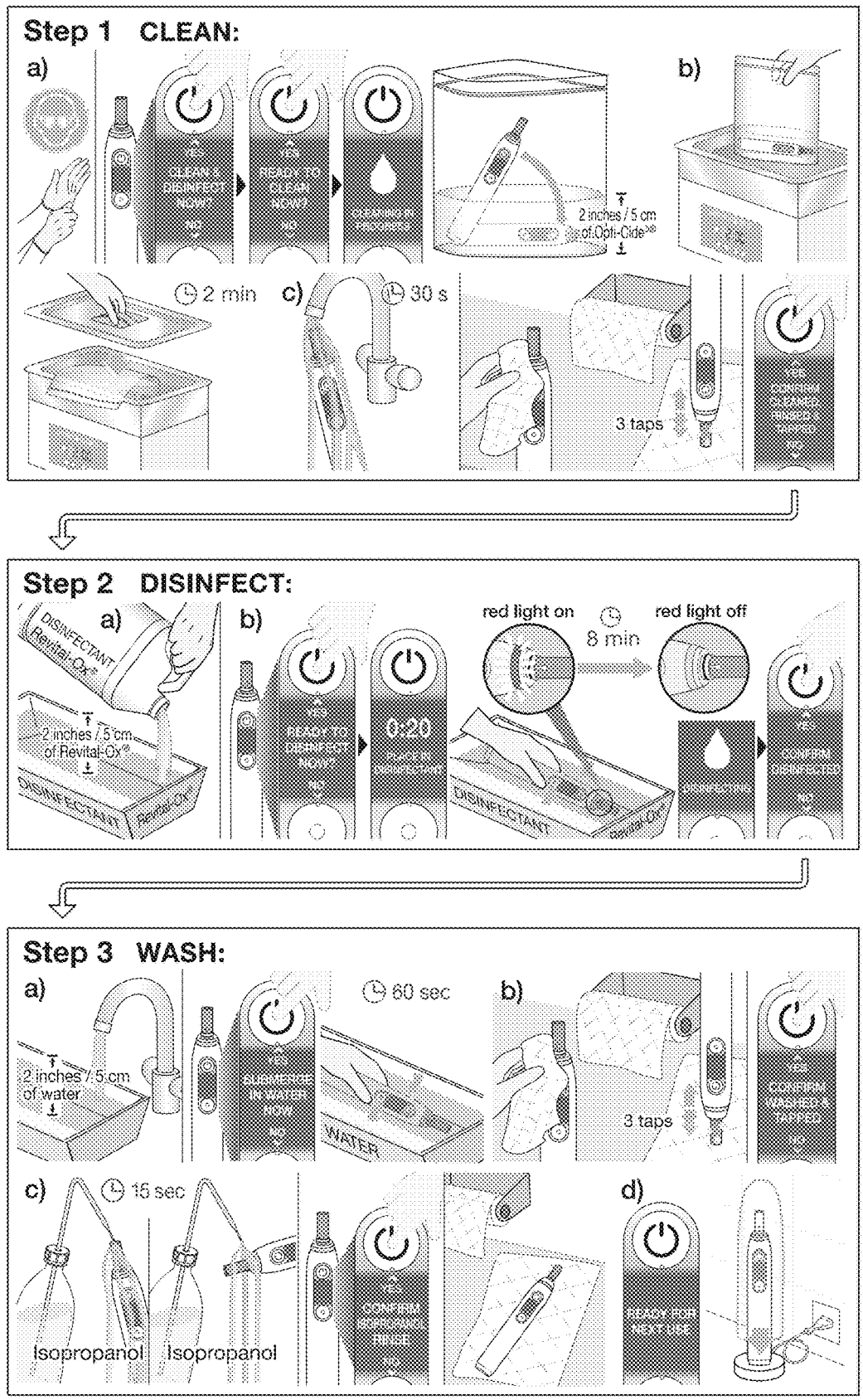
FIG. 11 is a schematic diagram is illustrating a cleaning-and-disinfection procedure of an electric toothbrush according to one embodiment.

Step 1: Cleaning
  The display 170 exhibits: "Clean & Disinfect Now?" (FIG. 10A);
  The operator presses the power button 180, thereby indicating "Yes" and initiating the procedure (Mode button 190 indicates "No");
  The display 170 exhibits: "Ready to Clean Now?" (FIG. 10B);

The operator presses the power button 180, thereby indicating "Yes" and initiating the cleaning process (FIG. 10C);

The display 170 exhibits: "Cleaning in Process" (FIG. 10D);

The operator fully immerses the handle 100 in an ultrasonic cleaning solution, such as, e.g., Opti-Cide3 or a non-ammoniated ultrasonic general-purpose cleaner, disposed in an approximately one-gallon (four-liter) zipper bag, so that the handle 100, positioned generally horizontally in the bag, is fully immersed in the solution;

The operator seals the bag, places it in an ultrasonic bath at the room temperature (at least 20° C.), and lets the ultrasonic cleaning run for at least 2 minutes;

The operator removes the handle 100 from the bag and rinses it with tap water for about 30 second, dries the handle 100 with a paper towel, and removes residual water by turning the handle 100 upside down, so that the output element 120 is at the bottom and ready to contact a paper towel disposed on a hard horizontal surface, and slightly tapping it at least three times on the paper towel;

The display 170 exhibits: "Confirm Cleaned, Rinsed & Tapped"; once the handle 100 is dry, the operator presses the power button 180, confirming that the handle 100 is cleaned, rinsed, & tapped (FIG. 10E). This concludes the cleaning step.

Step 2: Disinfection

Figure 10J:
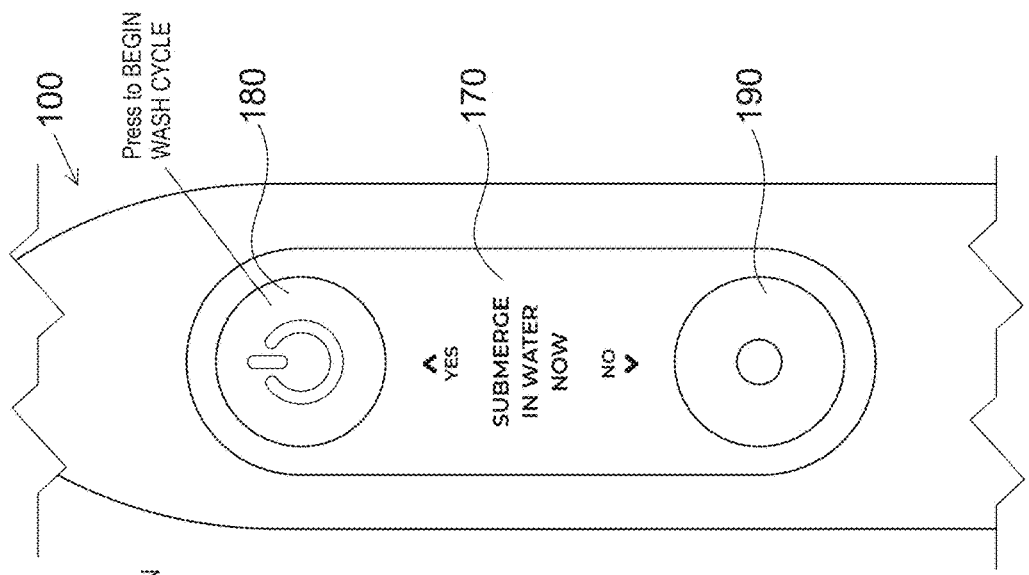
Figure 10I:
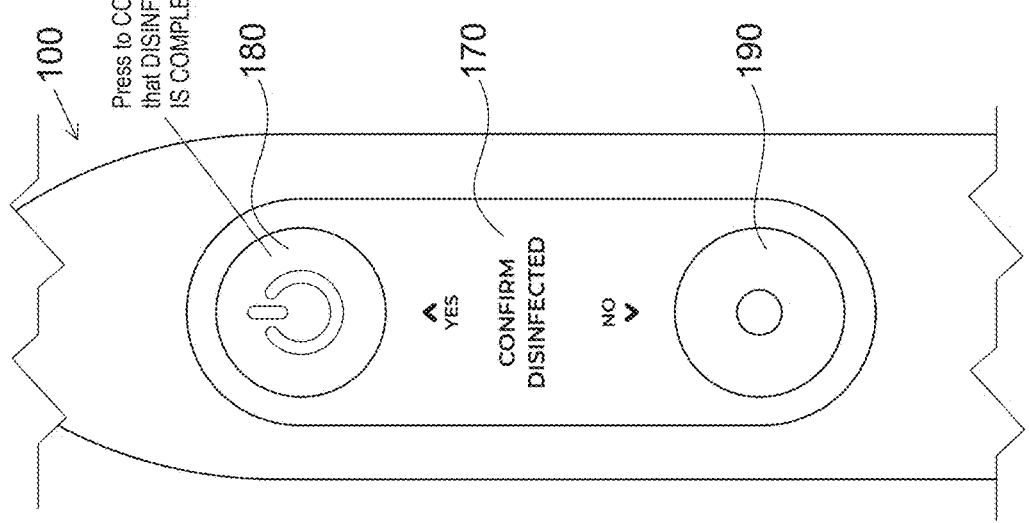
Figure 10H:
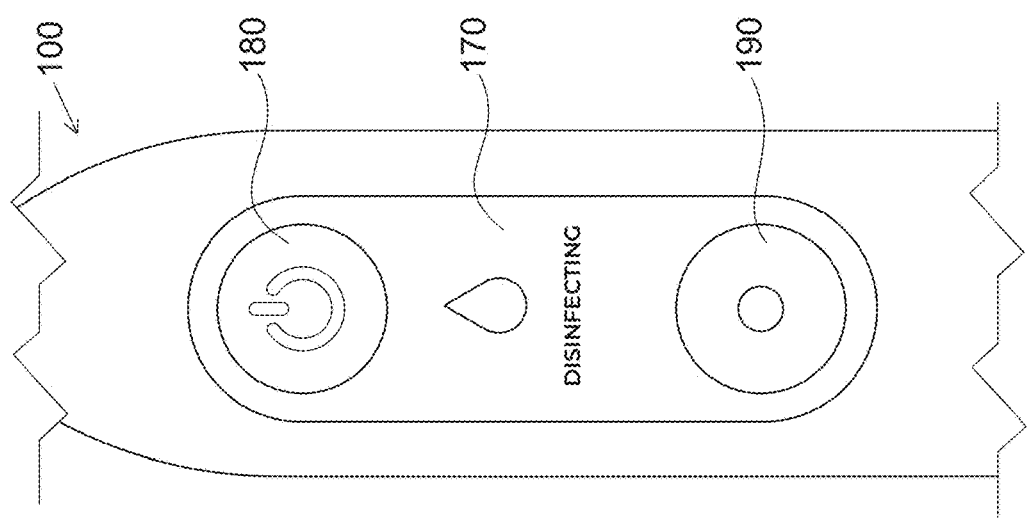
Figure 10M:
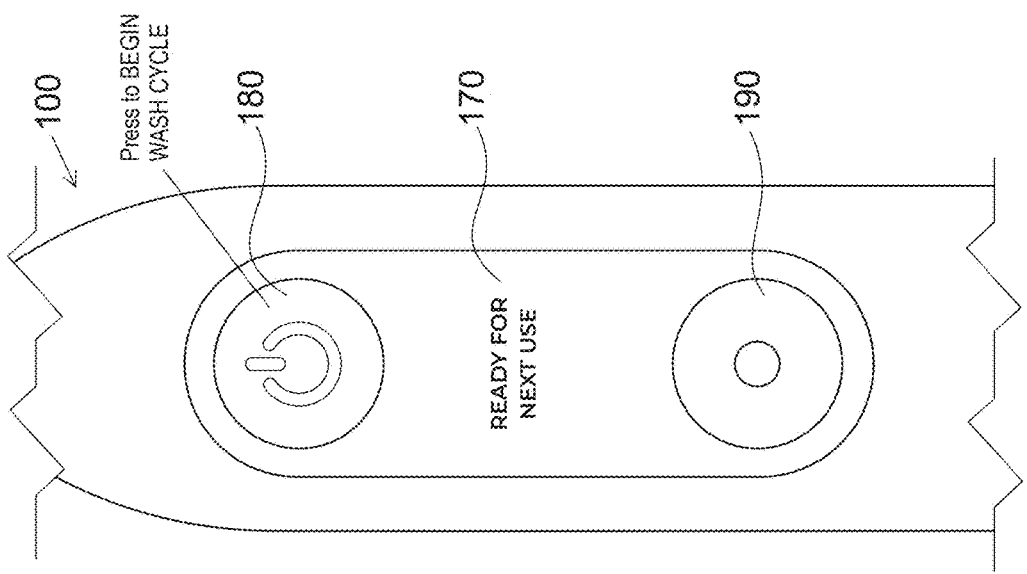

The operator fills the disinfection bath with approximately 2 inches (5 centimeters) of Revital-Ox® RESERT® disinfectant, at room temperature, to fully submerge the handle 100 horizontally thereinto (not shown);

The display 170 exhibits: "Ready to Disinfect Now?" (FIG. 10F);

The operator presses the power button 180, indicating "Yes" and confirming that all is ready for the disinfection process;

The display 170 exhibits: "Place in Disinfectant" (FIG. 10G), and a 20-second count starts, allowing the operator the time to lay the handle 100 horizontally in the disinfection bath and to make sure that the entire handle 100, including the adapter 150 and the output element 120, is fully immersed in the disinfectant;

At the end of the 20-second countdown, the handle 100 begins to vibrate for 40 seconds, during which the vibration flushes the disinfectant through the adapter 150 including the output element 120, ensuring proper disinfection inside and out of those, wherein the display 170 exhibits: "Disinfecting" (FIG. 10H);

After the 40-second vibration period has expired, the handle 100 must remain fully submerged in the disinfectant, for at least 440 seconds;

Thereafter, the display 170 exhibits: "Confirm Disinfected" (FIG. 10I);

The operator presses the power button 180 to confirm that the disinfection has been completed. This concludes the disinfection step.

A block diagram illustrating an embodiment of the step of disinfection is illustrated in FIG. 9. In this embodiment, the handle 100 is provided with the display 170 and a light indicator 160 (FIG. 2) structured and configured to flash (e.g., in red) during the 40-second vibration period. The example light indicator 160 shown in the embodiment of FIG. 2 has a shape of a ring adjacent to the adapter 150.

Step 3: Washing and Drying

Figure 10L:
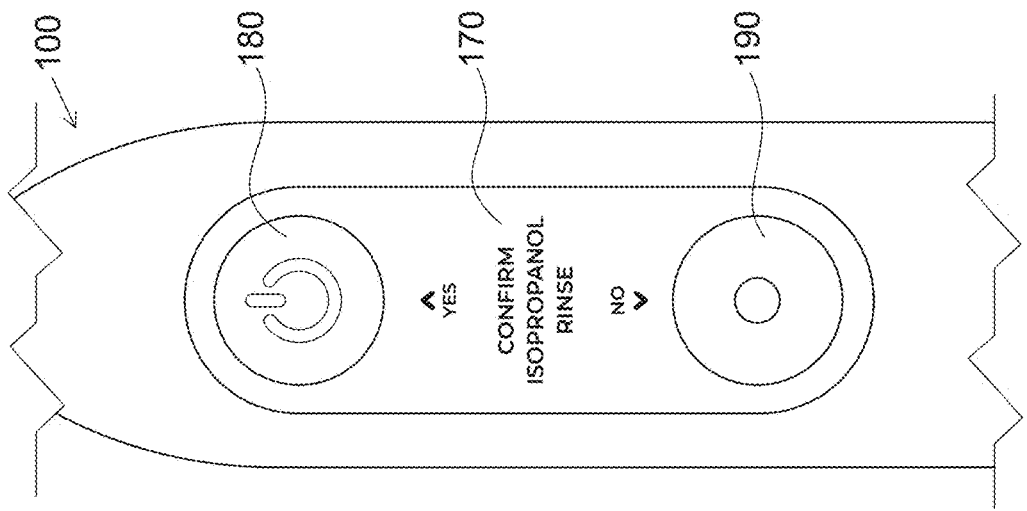
Figure 10K:
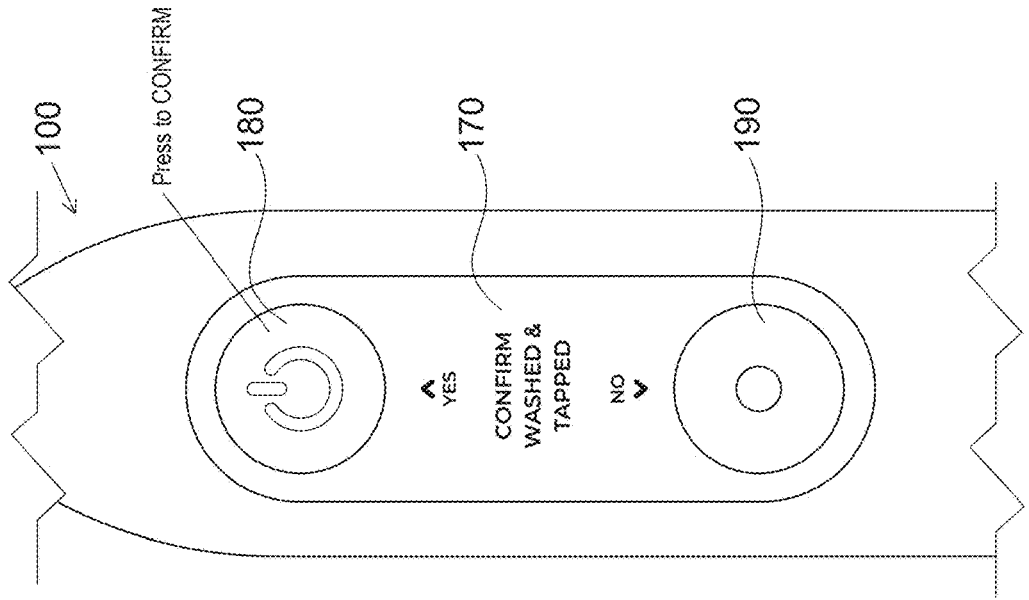

The operator fills a water bath with about 2 inches (5 cm) of tap water, to fully submerge the handle 100 horizontally;

The display 170 exhibits: "Submerge in Water Now" (FIG. 10J);

The operator presses the power button 180 to begin a washing cycle (FIG. 10J), fully submerges the handle 100 into the water bath, and lets it sit there for at least 1 minute;

After 1 minute, the operator dries and taps the handle 100 upside down (as previously described);

The display exhibits: "Confirm Washed & Tapped" (FIG. 10K);

The operator presses the power button 180 to confirm that the handle 100 has been washed, dried, and tapped;

The operator rinses the handle 100, including the adapter 150 and the output element 120, inside and out, with 70% Isopropanol solution for at least 15 seconds;

The display 170 exhibits: "Confirm Isopropanol Rinse" (FIG. 10L);

The operator presses the power button 180 to confirm that the handle 100 has been rinsed with Isopropanol;

The operator places the handle 100 on a paper towel to allow it to dry.

This concludes the cleaning-and-disinfection procedure according to one embodiment thereof. The handle 100 is now ready for the next use. The display 170 exhibits: "Ready For Next Use."

As is previously described, the handle 100 may include the light indicator 160. In the embodiment of FIG. 2, the light indicator 160 is shown in the shape of a ring, although other suitable arrangements of the light indicator 160 are contemplated herein. Additionally or alternatively, the handle 100 may include a sound indicator (not shown) to signal the beginning and the end of at least some of the steps of the procedure. For example, the light indicator 160 can be programmed to light (e.g., steady or flush) during the entire disinfection period, including the 40-second vibration period while the handle 100 is fully immersed in the disinfectant, and the subsequent 8-minute period when the handle 100 remains fully submerged in the disinfectant for additional 8 minutes, as is described herein above. In another embodiment, the handle 100 can include a light indicator that is programmed to light and change the color (e.g., from red to green or vice versa) at the beginning and the end of a particular step or sub-step (i.e., disinfection) of the cleaning-and-disinfection procedure.

In still another aspect, the disclosure is directed to an oral-care system for safe and hygienic use by multiple users, the system comprising: a handle 100 and a replaceable head 200 attachable to and detachable from the handle 100, the handle 100 having an electrical motor 110 arranged to drive an output element 120 structured and configured to couple the handle 100 and the head 200; a microcontroller 130 for controlling the motor 110; a user interface 175 (FIGS. 1 & 2) including an interactive, user-interface display 170, for obtaining information and communicating instructions related to controlling functional operation of the handle 100, wherein the user interface 175 includes at least one switch 180 in operative communication with the microcontroller 130 to allow a user to control the functional operation of the handle 100; wherein the functional operation of the handle 100 includes (a) causing the output element 120 to vibrate in at least one oral-hygiene mode during which the oral-care system is being used for an oral-hygiene routine, and (b) causing the output element 120 to vibrate in a disinfection mode at a modulated frequency continuously alternating up and down within a frequency range of from about 140 Hz to about 250 Hz during a disinfection routine taking place before or after the oral-hygiene routine.

The user interface 175 can be selected from the group consisting of a display, a speaker, a microphone, and any combination thereof. More specifically, the user interface 175 can be selected from the group consisting of a user interface that is internal, i.e., incorporated into the handle 100, a user interface 175 that is external, i.e., decoupled from the handle 100, and any combination thereof. An external user interface can be selected from the group consisting of a smartphone, a wireless tablet, a computer, a device dedicated to the oral-care system, and any combination thereof. The external user interface may be configured to communicate with the handle 100 via a wired or wireless connection, such as, e.g., Bluetooth, Wi-Fi, NFC.

The software can be set up in a way to allow the use of the oral-care system for a given period of time, allowing the usage with a first user. The software can then demand the operator to follow the instructions for the cleaning-and-disinfection procedure before the system can be used again with a second user. The software may be further configured to disable the brushing mode until the cleaning-and-disinfection procedure has been fully completed.

The at least one switch (180, 190) can be selected from the group consisting of a switch controllable by a push button (as is generally shown in several figures herein), a switch controllable by a rotatable selector, a switch controllable by an On/Off rocker, a switch controllable by a touch-screen surface, a switch controllable by a voice of a user, a switch controllable by a software protocol, and any combination thereof.

Figure 12:
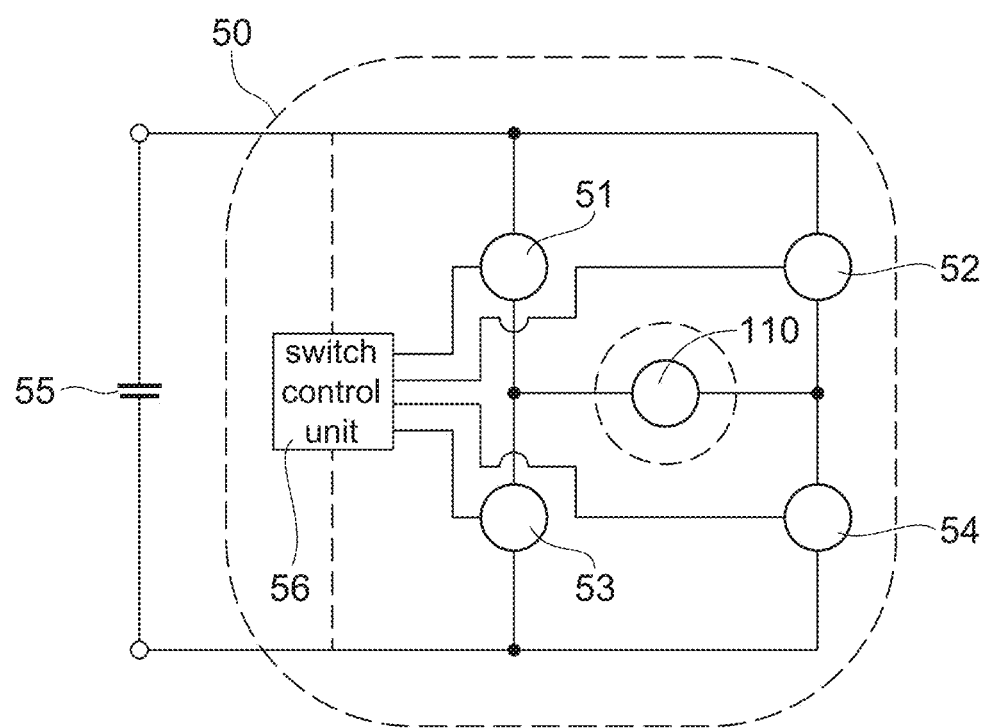
FIG. 12 is a schematic diagram of an embodiment of a motor-control arrangement to achieve a modulated frequency of an output element.

FIG. 12 is a schematic depiction of a motor control unit 50 for driving a motor 110 (which may be disposed in the handle 100) into an oscillating motion, e.g. a linear reciprocating motion, an oscillating rotation, or a combination thereof. U.S. Pat. Nos. 9,628,014 and 10,058,408, the disclosures of which are incorporated herein by reference, describe, inter alia, such a motor-control unit. The motor 110 can be any motor known in the art, e.g., a resonant motor or a conventional DC motor. If the resonant motor is utilized, it can be arranged, as a non-limiting example, in the bridge section of an H-bridge (or full bridge) circuit comprising, e.g., four switches 51, 52, 53, 54, which can be controlled by a switch control unit 56. As is disclosed in a commonly assigned WO 2004/034561 A1, the disclosure of which is incorporated herein by reference, a voltage supplied from a voltage source 55 can then be applied in a positive direction by switching ON switches 51 and 54 and switching OFF switches 52 and 53; and in a negative direction by switching ON switches 52 and 53 and by switching OFF switches 51 and 54. As is also described in WO 2004/034561 A1, it is possible to short-circuit the resonant motor 110 by, e.g., switching ON switches 53 and 54 and switching OFF switches 51 and 52. Each of the switches 51, 52, 53, and 54 may be realized as a field-effect transistor (FET), such as, e.g., a MOSFET. Each or at least one of the switches 51-54 may comprise an in-parallel connected protection diode for protecting the switch from overvoltage. The switches 51-54 are also chosen such that they can be switched with the pulse frequency required by the motor-control unit 50, e.g., 30 kHz, as one nonlimiting example.

While document WO 2004/034561 A1 describes that a single Voltage pulse can be applied at the resonant motor in each half cycle of each period, the motor-control unit 50 exemplified herein may comprise a synthesizer circuit for providing voltage pulses of varying pulse length to the resonant motor at a pulse frequency that is at least four times higher than the driving frequency at which the resonant motor is driven. The idea behind the application of Voltage pulses at a respectively high pulse frequency is to model a target shape of the average periodic Voltage signal by the Voltage pulses having essentially constant height (the Voltage height may be determined by a voltage source) but varying pulse length (digital 25 synthesis). A sinusoidal periodic Voltage signal would then lead to a sinusoidal current flow through the motor coil. Typically, a resonant motor in a personal hygiene device may be driven at a driving frequency of between about 50 Hz to about 500 HZ, which shall not exclude other driving frequency values.

Electric toothbrushes are often driven at a frequency of between about 65 Hz to about 300 Hz. As a non-limiting example, a driving frequency of 150 Hz may be used. The pulse frequency can be realized by having the constant temporal distance between consecutive Voltage pulses; the pulses may have varying pulse length in order to model the target shape of the periodic Voltage signal. The pulse frequency should be at least four times, and more specifically at least 6 times, higher than the driving frequency; then, at least three Voltage pulses are applied per half cycle. Optionally, the pulse frequency can be at least 20 times higher than the driving frequency; then, at least ten Voltage pulses are applied per half cycle. Further, the pulse frequency can be at least a hundred times higher than the driving frequency; then, at least 50 voltage pulses are applied per half cycle). For example, at a driving frequency of 150 Hz, the pulse frequency may be at least 900 Hz, at least 3 kHz, or at least 15 kHz. Generally, the pulse frequency may be above 18 kHz, and optionally above 20 kHz, in order to shift the pulse frequency into a non-audible (for the human ear) frequency range. The pulse frequency may be chosen to be below 100 kHz.

In one embodiment, the motor control unit 50 provides via its synthesizer circuit Voltage pulses of variable length at the resonant motor. In order to allow a sensible shaping of the average periodic Voltage signal, the length of each Voltage pulse should be controllable with sufficient resolution, which requires that the Voltage pulse length can be controlled at a clocking frequency of the motor control unit 50 that is higher than the pulse frequency, e.g., 128 times higher (resulting in a 7-bit resolution of the voltage pulse) or 256 times higher (8-bit resolution). Higher or lower resolutions, such as, e.g., 9-bit resolution, 10-bit resolution, 6-bit resolution, 5-bit resolution, 4-bit resolution, etc., shall not be excluded. For example, at 15 kHz pulse frequency, the clocking frequency would be 3.84 MHz for an 8-bit resolution. As another example, at the driving frequency is 150 Hz, the pulse frequency is 30 kHz and the resolution is 7-bit (leading to a clocking frequency of 3.84 MHz).

In an embodiment in which a DC motor is utilized (not shown), the motor-control unit can be configured to have the motor voltage controlled by a pulse-width modulation (PWM) motor control loop, as is known in the art. Such a control system can assure that for various battery-charge states (i.e., different battery voltages), a constant voltage is applied to the motor. The motor can be designed to operate at a voltage lower than the battery voltage of a fully charged system. The lower voltage is generated by providing voltage pulses having a frequency of about 16 kHz at the motor, which is higher than the motor time constant to enable a continuous motor current flow, having a respective duty cycle to reduce the battery voltage to the required motor voltage. In order to perform the closed-loop control, the motor voltage is RC-filtered to an averaged motor voltage—and then continuously measured in fixed time intervals at the microcontroller's A/D input. The digital value of the averaged voltage can be compared to a digital reference level. If the digital value is lower that the digital reference level, the PWM duty cycle will be increased. If the digital value is higher than or equal to the digital reference level, the PWM the duty cycle will be decreased. Absolute resolution of duty cycle for motor voltage control (PWMres) can be about 0.1%.

Throughout this specification, certain embodiments may be described herein as including logic or a number of routines, subroutines, phases, applications, instructions, and the like. These may constitute either software (e.g., code embodied on a machine-readable medium or in a transmission signal) or hardware. In hardware, the routines, etc., are tangible units capable of performing certain operations—and may be configured or arranged in a certain manner. For example, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

Unless specifically stated otherwise, discussions herein using words such as "processing," "computing," "calculating," "determining," "presenting," "displaying," "exhibiting," and the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information. Terms such as "step," "stage," "phase," "process," "procedure," "routine," "subroutine," and the like can be used herein synonymously.

As used herein any reference to "one embodiment" or "an embodiment" means that a particular element, feature, structure, or characteristic described in connection with the embodiment is included in at least one embodiment—but does not mean that such element, feature, structure, or characteristic is not included in another embodiment or other embodiments. The appearances of the phrase "in one embodiment" in various places in the specification are not necessarily all referring to the same embodiment.

Some embodiments may be described using the expressions "coupled" and "connected" along with their derivatives. For example, some embodiments may be described using the term "coupled" to indicate that two or more elements are in direct physical or electrical contact. The term "coupled," however, may also mean that two or more elements are not in direct or physical contact with one another, but yet still cooperate or interact with one another. The embodiments are not limited in this context.

As used herein, the terms "comprises," "comprising," "includes," "including," "has," "having," or any other variation thereof, are intended to cover a non-exclusive inclusion. For example, a process, method, article, or apparatus that comprises (or includes or has) a list of elements is not necessarily limited to only the elements listed—but may include other elements not expressly listed or inherent to such process, method, article, or apparatus. Further, unless expressly stated to the contrary, the (inclusive) conjunction "or" is synonymous with the conjunction "and/or"—and means either or both of two stated possibilities. For example, a condition "A or B" ("A and/or B") is satisfied by any one of the following: (1) A is true (or present) and B is false (or not present); (2) A is false (or not present) and B is true (or present); and (3) both A and B are true (or present).

Use of the article "a" or "an" is employed to describe elements and components of the embodiments herein. This is done merely for convenience and to give a general sense of the description. This description, and the claims that follow, should be read to include one or at least one, and the singular also includes the plural, unless it is obvious that it is meant otherwise. "At least one" means, likewise, that there could be one, two, three, . . . and more elements so described.

In the context of this disclosure, the term "substantially" refers to an arrangement of elements or features that, while in theory would be expected to exhibit exact correspondence or behavior, may in practice embody something slightly less than exact. As such, the term denotes the degree by which a quantitative value, measurement, or other related representation may vary from a stated reference without resulting in a change in the basic function or characteristic of the subject matter at issue.

In addition, the dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean a dimension of "about 40 mm" Use of the plus-minus sign (± or +x/−y) is employed to describe deviations from the numerical ranges indicated herein. For example, a range of "about (11±2) seconds" means a range from about 9 seconds to about 13 seconds; and a range of "about (155+5/−10) Hz" means a range from about 145 Hz to about 160 Hz.

The disclosure of every document cited herein, including that of any cross-referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests, or discloses any such invention. Further, to the extent that any meaning or definition of a term in this document conflicts with any meaning or definition of the same term in a document incorporated by reference, the meaning or definition assigned to that term in this document shall govern.

This detailed description is to be construed as exemplary only and does not describe every possible embodiment, as describing every possible embodiment would be impractical, if not impossible. One could implement numerous alternate embodiments, using either current technology or technology developed after the filing date of this application.

What is claimed is:

1. A handle for an oral-care implement, the handle comprising:
　an electrical motor arranged to drive an output element structured and configured to couple the handle and a head attachable to and detachable from the handle; and
　a microcontroller for controlling the motor and to cause the output element to vibrate in
　　(a) at least one oral-hygiene mode during which the oral-care implement is being used for an oral-hygiene routine, wherein the output element is vibrating at a substantially constant frequency, and (b) a disinfection mode wherein the handle is being disinfected during a disinfection routine, before or after being used for the oral-hygiene routine, wherein the output element is continuously vibrating at a modulated frequency alternating within a frequency range of between about 140 Hz and about 250 Hz, for a duration of the disinfection routine.

2. The handle of claim 1, wherein the duration of the disinfection routine is from about 20 seconds to about 60 seconds.

3. The handle of claim 2, wherein the duration of the disinfection routine is from about 35 seconds to about 45 seconds.

4. The handle of claim 1, wherein the modulated frequency increases from about (155+5/−10) Hz to about (235+10/−5) Hz within about (11±2) seconds.

5. The handle of claim 4, wherein the modulated frequency decreases from about (235+10/−5) Hz to about (165+5/−10) Hz within about (11±2) seconds.

6. The handle of claim 5, wherein the modulated frequency increases from about (165+5/−10) Hz to about (235+10/−5) Hz within about (11±2) seconds.

7. The handle of claim 6, wherein the modulated frequency decreases from about (235+10/−5) Hz to about (190+5/−10) Hz within about (5.5±2) seconds.

8. The handle of claim 1, wherein the modulated frequency changes substantially linearly.

9. The handle of claim 1, wherein the at least one oral-hygiene mode comprises a plurality of oral-hygiene modes, wherein each of said plurality of oral-hygiene modes differs from every other oral-hygiene mode in said plurality in at least one characteristic selected from the group consisting of frequency, amplitude, and any combination thereof.

10. An oral-care implement for safe and hygienic use by multiple users, the implement comprising a handle structured and configured to be attached to a replaceable head, wherein the handle comprises:
   an electrical motor arranged to drive an output element structured and configured to couple the handle and the replaceable head for a vibratory movement of the replaceable head; and
   a microcontroller for controlling the motor to cause the output element to vibrate in
   (a) at least one oral-hygiene mode during which the oral-care implement is being used for an oral-hygiene routine, wherein the output element is vibrating at a substantially constant frequency, and
   (b) a disinfection mode during which the handle is being disinfected, before or after being used for the oral-hygiene routine, wherein the output element is continuously vibrating at a modulated frequency alternating in a frequency range of between about 140 Hz and about 250 Hz, for a duration of a disinfection routine.

11. A handle for an oral-care implement, the handle comprising:
   an electrical motor arranged to drive an output element disposed at an end of the handle and structured and configured to couple the handle and a head attachable to and detachable from the handle; and
   a microcontroller for controlling the motor and to cause the output element to vibrate in
   (a) at least one oral-hygiene mode during which the oral-care implement is being used for an oral-hygiene routine, wherein the output element is vibrating at a substantially constant frequency, and
   (b) a disinfection mode wherein the handle is being disinfected during a disinfection routine, before or after being used for the oral-hygiene routine, wherein the output element is continuously vibrating at a modulated frequency alternating between a low modulated frequency and a high modulated frequency, wherein the high modulated frequency is at least 50 percent greater than the low modulated frequency.

12. The handle of claim 11, wherein the high modulated frequency is at least 60 percent greater than the low modulated frequency.

13. The handle of claim 11, wherein the high modulated frequency is at least 70 percent greater than the low modulated frequency.

* * * * *